(12) United States Patent
Kawashima et al.

(10) Patent No.: US 7,620,050 B2
(45) Date of Patent: Nov. 17, 2009

(54) COMMUNICATION CONTROL DEVICE AND COMMUNICATION CONTROL METHOD

(75) Inventors: Jun Kawashima, Setagaya-ku (JP); Kazuhiko Morimura, Ohta-ku (JP); Ken-ichi Morikawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 671 days.

(21) Appl. No.: 11/222,988

(22) Filed: Sep. 9, 2005

(65) Prior Publication Data

US 2006/0056410 A1    Mar. 16, 2006

(30) Foreign Application Priority Data

Sep. 10, 2004 (JP) .............. 2004-264644
Sep. 10, 2004 (JP) .............. 2004-264645

(51) Int. Cl.
*H04L 12/56* (2006.01)
*H04J 3/22* (2006.01)
*H04J 3/24* (2006.01)

(52) U.S. Cl. ................ 370/393; 370/469; 370/474

(58) Field of Classification Search ........ 370/389, 370/392, 471, 474
See application file for complete search history.

(56) References Cited

U.S. PATENT DOCUMENTS

| 6,996,070 | B2 * | 2/2006 | Starr et al. .............. 370/252 |
| 7,324,540 | B2 * | 1/2008 | Vangal et al. ............ 370/419 |
| 7,400,639 | B2 * | 7/2008 | Madukkarumukumana et al. .................... 370/429 |
| 7,460,473 | B1 * | 12/2008 | Kodama et al. .......... 370/230 |
| 7,583,706 | B2 * | 9/2009 | Arai et al. ............... 370/513 |
| 2003/0076822 | A1 * | 4/2003 | Shalom et al. ........... 370/378 |
| 2005/0147126 | A1 * | 7/2005 | Qiu et al. ................ 370/474 |

FOREIGN PATENT DOCUMENTS

| GB | 2340701 A | * | 2/2000 |
| JP | 11-215204 | | 8/1999 |
| JP | 2000-059463 | | 2/2000 |
| JP | 2001-268159 | | 9/2001 |
| JP | 2004-048392 | | 2/2004 |

* cited by examiner

*Primary Examiner*—Tri H Phan
(74) *Attorney, Agent, or Firm*—Cowan, Liebowitz & Latman, P.C.

(57) ABSTRACT

A communication control device comprises a calculation part for calculating the number of frames and the frame length for transmitting the transmit data, a payload division part for dividing the transmit data into frame units based on the calculation results of the calculation part, and a header generation part for generating a header to be appended to the transmit data of frame unit based on the calculation results of the calculation part in the midst of dividing the transmit data by the payload division part. Thereby, the parallel processing ability of the hardware can be exhibited, a memory management method can be simplified, and the transmit data can be outputted as the frame at high speed.

22 Claims, 23 Drawing Sheets

BLOCK DIAGRAM

TCP HEADER GENERATION FLOWCHART

FIG. 10 IP HEADER GENERATION FLOWCHART

BLOCK DIAGRAM

TCP HEADER FORMAT

TCP PSEUDO HEADER FORMAT

UDP HEADER FORMAT

FIG. 20

IP HEADER FORMAT

| 0 | | 15 | 16 | 31 |
|---|---|---|---|---|
| VERSION | HEADE LENGTH | TOS | TOTAL LENGTH (BYTES) ||
| IDENTIFIER ||| FLAG / FLAGMENT OFFSET ||
| TTL || PROTOCOL | HEADER CHECK SUM ||
| ORIGINATED IP ADDRESS |||||
| DESTINATION IP ADDRESS |||||

MAC HEADER FORMAT

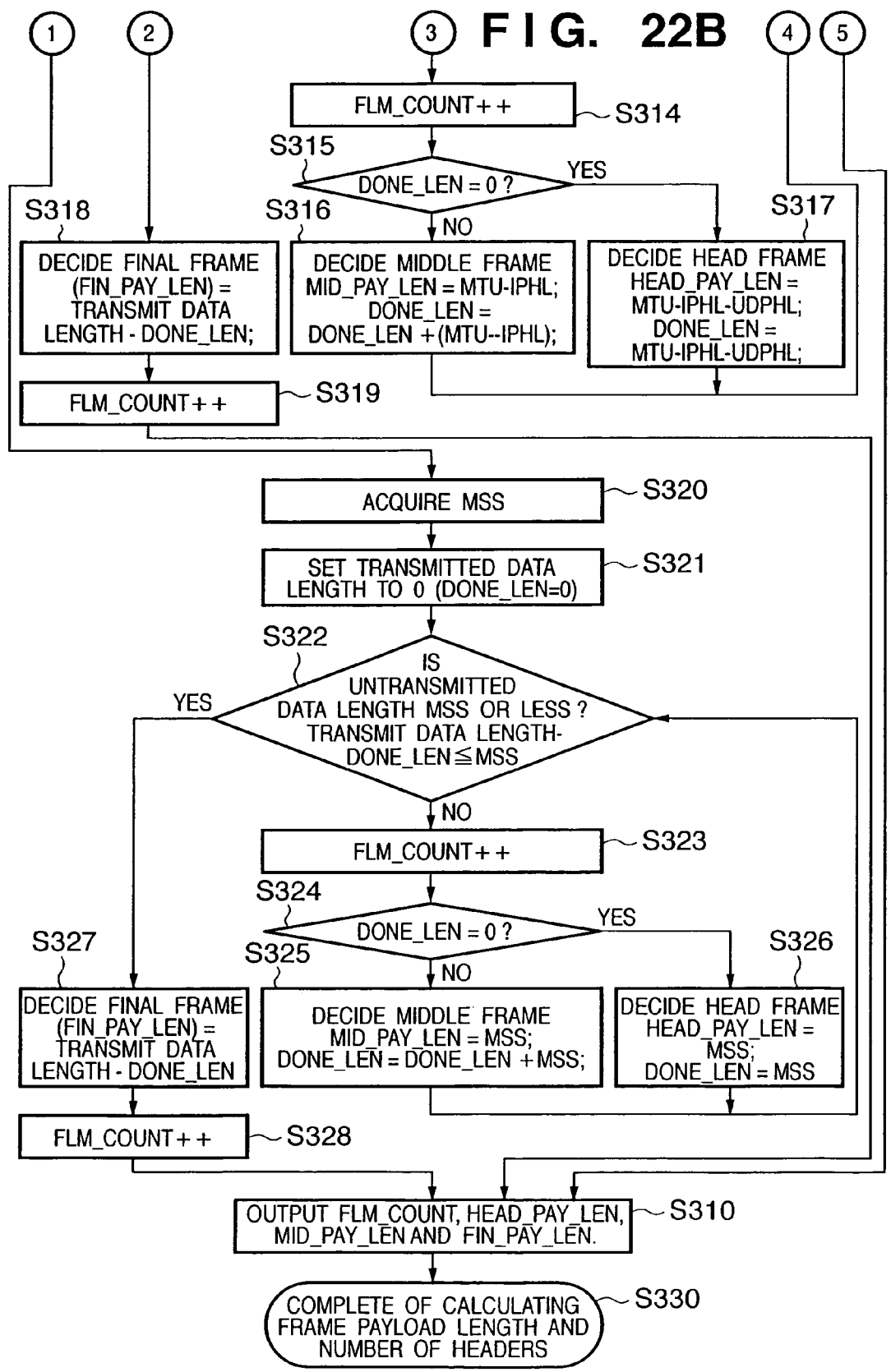

COMMUNICATION CONTROL DEVICE AND COMMUNICATION CONTROL METHOD

FIELD OF THE INVENTION

The present invention relates to a communication control device and a communication control method.

BACKGROUND OF THE INVENTION

There are increasing chances and demands for connecting the equipment such as a portable terminal, a printer, a camera, a copying machine, a display, a video apparatus, and a sound device, other than the personal computer, directly with a network. Though such equipment may or may not mount a CPU of comparatively low price and low processing performance. When the Internet standard protocol such as Transmission Control Protocol (TCP), User Datagram Protocol (UDP) or Internet Protocol (IP) is implemented, using such equipment resources, the following methods are considered.

Implement a TCP/UDP/IP protocol stack though the CPU of low processing performance at low bit rate (band).

Implement the network communication of relatively wide band by using an auxiliary device specialized to the protocol process such as a TCP/IP off-road engine (TOE).

However, while the amount of information treated by the equipment is growing in any of the photo, dynamic image and music, it is necessary to suppress the cost of equipment to the low price. In this background, it is easy to imagine that the approach for achieving a network communication function by TOE will increase in the future.

In achieving the TCP/IP protocol stack by hardware (TOE achievement), there is an idea that the method of achievement only by software until now is implemented by hardware to make this protocol stack most simply. The TCP/UDP/IP protocol stack that is achieved by software is based on the method of enough withering, and this idea is one appropriate idea. However, when the method contrived for software (for CPU) is employed for hardware, it is doubtful that the software implementation method is the appropriate implementation method by hardware. The hardware is weak in a complex pointer process, dynamic generation or annihilation of variable, a recursive process, and a lot of process generation. Therefore, the TCP/IP protocol stack implemented by software has many procedures such as a complex pointer process, dynamic generation or annihilation of variable or memory area everywhere.

If the conventional procedure is implemented directly by hardware, the following flow is roughly pursued.

(1) Temporarily store one series of transmit data instructed to transmit from an application device in a consecutive shared memory area.

(2) The protocol control block at the highest level refers to, divides, and adds the header to one series of transmit data stored in the shared memory, and passes the control to the next protocol control block together with the access right of the shared memory. Each protocol control block sequentially refers to, divides, and adds the header to the shared memory.

(3) Arrange the header and the payload adjacently in a consecutive memory space. Herein, when all of the payload can not be arranged in the consecutive memory space, arrange only the payload in another memory space.

(4) The payload adjacent or not adjacent to the header, and the continuous frame relation, are stored as memory control information in the memory in the number as required (typically called mbuf).

That is, the header is generated after complex payload division and the generation of the management information (mbuf) for the payload or header, and this processing is executed sequentially for each protocol stack.

In the prior technical document 1, there was described a communication control device in which either general-purpose protocol processing means that is configured by a processor that communicates general-purpose data, or special-purpose protocol processing means for uniting the header information and the transmit data, is appropriately selected according to the transmit data (the prior technical document 1: Japanese Patent Laid-Open No. 2000-59463).

Moreover, in the prior technical document 2, there was described a semiconductor circuit device in which the packet is divided into partial data, and each of a plurality of processes for divided partial data is performed in parallel (the prior technical document 2: Japanese Patent Laid-Open No. 2004-48392).

Also, in the prior technical document 3, there was described a data transmission device for writing the protocol control information for the division data at the top or the end of the division data, and transmitting the protocol control information and the division data collectively as one packet (the prior technical document 3: Japanese Patent Laid-Open No. 11-215204).

Also, in the prior technical document 4, an apparatus for processing the TCP/IP by hardware and its operation method were described (the prior technical document 4: Japanese Patent Laid-Open No. 2001-268159).

However, the above method had the following problems.

(1) The parallel processing ability that hardware originally has can not be exhibited.

(2) The memory management method employs many pointer processings, and is not implemented easily by hardware.

Moreover, when the above-mentioned procedure is pursued, it is required to write all the headers for individual frames into the memory, when the TCP segmentalization or the IP fragmentation is needed due to the transfer unit of application. That is, there is a problem that if the transfer unit of application is greater for the MTU that depends on the link layer, the number of frames after division increases, and the memory area for writing the headers to the frames also increases.

In general, the header and the payload are built into the frame within the memory and outputted. However, it is required to write all the headers for individual frames into the memory, when the TCP segmentalization or the IP fragmentation is needed due to the transfer unit of application.

SUMMARY OF THE INVENTION

It is an object of the invention to be able to exhibit the parallel processing ability of the hardware.

It is another object of the invention to output the transmit data as the frame at high speed by using a simplified memory management method.

It is another object of the invention to generate and transmit the frame without need of securing a memory area for the header and making the address management.

In order to accomplish the above object, according to one embodiment of the invention, a communication control apparatus comprising:

a calculation device configured to calculate the number of frames and the frame length for transmitting the transmit data;

a division device configured to divide the transmit data into frame units based on the calculation results by the calculation device; and a header generation device configured to generate a header to be appended to the transmit data of the frame unit based on the calculation results by the calculation device in the midst of dividing the transmit data by the division device is provided.

Also, according to another embodiment of the invention, a communication control apparatus comprising:

a protocol control device configured to collect the header generation information required for generating a frame, and to output a header generation instruction and the header generation information for every frame;

a header generation device configured to generate a header for every header and to output a header generation completion notice if the header generation instruction and the header generation information are inputted from the protocol control device; and a header/payload synthesis device configured to synthesize the generated header and payload of frame unit into the frame if the header generation completion notice is inputted from the header generation device is provided.

Also, according to another embodiment of the invention, a communication control method comprising:

a calculation step of calculating the number of frames and the frame length for transmitting the transmit data;

a division step of dividing the transmit data into frame units based on the calculation results at the calculation step; and a header generation step of generating a header to be appended to the transmit data of the frame unit based on the calculation results at the calculation step, the header generation step being started in parallel with dividing the transmit data at the division step is provided.

Also, according to another embodiment of the invention, a communication control method comprising:

a protocol control step of collecting the header generation information required for generating a frame, and outputting a header generation instruction and the header generation information for every frame;

a header generation step of generating a header for every frame and outputting a header generation completion notice if the header generation instruction and the header generation information are inputted; and a header/payload synthesis step of synthesizing the generated header and payload of frame unit into the frame if the header generation completion notice is inputted is provided.

Other objects of the invention will be apparent from the following detailed description of the invention and drawings.

BRIEF DESCRIPTION OF THE DRAWINGS

FIG. 20 is a diagram showing an IP header format;
FIGS. 22A and 22B are flowcharts showing a flow of calculating the payload length and the number of headers.

DETAILED DESCRIPTION OF THE PREFERRED EMBODIMENTS

First Embodiment

Figure 1:
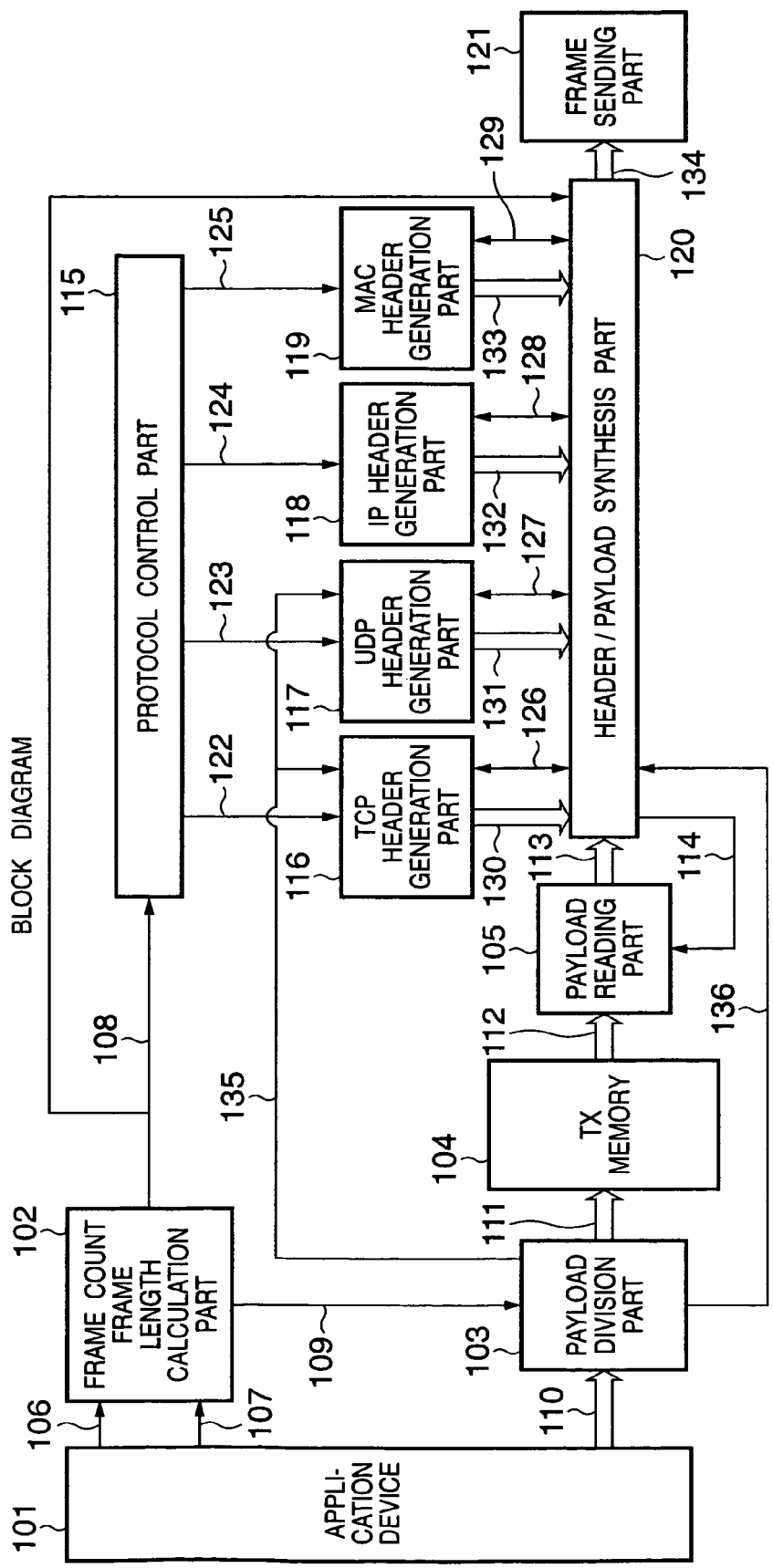
FIG. 1 is a block diagram of a communication control device according to a first embodiment of the present invention.

FIG. 1 is a block diagram of a communication control device according to a first embodiment of the present invention. Referring to FIG. 1, the configuration of the communication control device will be described below.

[Application Device]

An application device 101 outputs a transmission request 106 and a transmit data length 107 to a frame count frame length calculation part (hereinafter referred to as an FFC) 102, and outputs the transmit data 110 to a payload division part 103. Two kinds of application device 101 may be supposed. The first kind is a device of constant bit rate (information amount per unit time is constant). The second kind is a device of variable bit rate (information amount per unit time is variable, but explicit). Besides, a device in which the information from the device of variable bit rate is temporarily buffered, and shaped to output a fixed amount of information periodically may be supposed. However, this device is regarded as the same device as the first kind. Also, a device for outputting the RAW information at a quantization bit rate predefined by the sampling frequency may be supposed. However, this device is regarded as the same device as the first kind.

The communication control device according to this embodiment which is connected to each application device 101 receives the transmission request 106, the transmit data length 107 and the transmit data 110 through an interface with the application device 101.

[Frame Count Frame Length Calculation Part (FFC)]

The FFC 102 calculates how many frames the transmit data is divided into with a transmission request 106 inputted from the application device 101 as a trigger to be outputted, based on the transmit data length 107 similarly inputted.

Figure 22A:
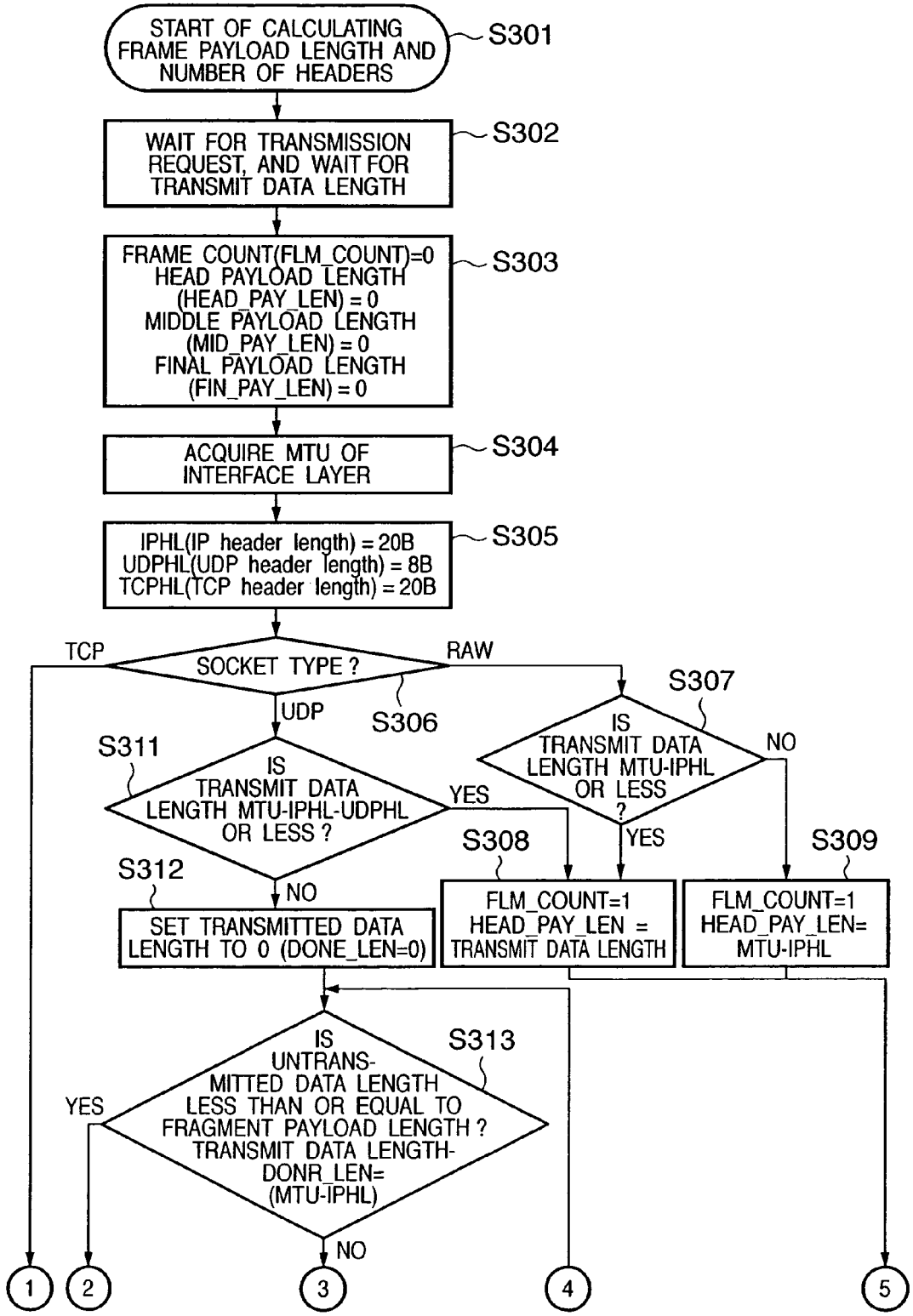

Referring to FIGS. 22A and 22B, a flow of calculating the payload length and the number of headers will be detailed below. The FFC 102 receives the transmission request 106 from the application device 101, and receives the length of data to be transmitted upon one time of transmission request as the transmit data length 107 (steps 301, 302). The FFC 102 initializes the number of frames (FLM_COUNT), head frame payload length (HEAD_PAY_LEN), middle frame payload length (MID_PAY_LEN), and final frame payload length (FIN_PAY_LEN) (step 303).

When a TCP/UDP is supposed, the maximum segment size (hereinafter MSS) of MTU or TCP of interface is considered as the frame length. Herein, first of all, the MTU of interface is acquired (step 304). Also, to calculate the frame payload length in handling the frame formed from TCP/UDP/IP, it is necessary to consider the length of each protocol header. Whereby, an IPHL (IP Header Length), a UDPHL (UDP Header Length) and a TCPHL (TCP Header Length) are defined (step 305). Though at step 305, each basic header length is indicated, when the option header is supposed in each protocol, the header length including the option header length is defined.

Next, the type of connection (socket type) is identified as TCP, UDP or RAW. The type of connection is held in advance in the FFC 102, or derived from a connection identifier (step 306).

In the case of UDP, it is confirmed whether or not the transmit data length is less than or equal to the interface layer MTU-IPHL-UDPHL (step 311). If the answer is YES, the transmit data given to one frame can be all stored, whereby the number of frames is set to 1 and the head frame payload length equalizes the transmit data length (step 308). Also, if the answer is NO, it is required that the transmit data is divided into a plurality of frames. The operation for calculating the number of dividing the frame and each payload length is made by dividing the frame, considering which situation occurs if the frame is transmitted. Firstly, the virtual transmitted data length (DONE_LEN) is set to 0 (step 312). It is confirmed whether or not the untransmitted data length is less than or equal to a fragment payload length. This is made in such a way that because the final fragment is judged, the untransmitted data length is calculated by subtracting the virtual transmitted data length (DONE_LEN) from the transmit data length and compared with the MTU-IPHL length (step 313).

In the flow of this preparatory check, it does not occur that the untransmitted data length is less than or equal to the fragment payload length in the first comparison. Next, the number of frames (FLM_COUNT) is incremented (step 314). If the transmitted data length is 0 (step 315), the head frame is determined, whereby it is decided that the payload length of the head frame is equal to MTU-IPHL-UDPHL and the virtual transmitted data length is equal to MTU-IPHL-UDPHL (step 317). Other than the head frame, the middle frame is determined, whereby the middle frame length is equal to MTU-IPHL, and the virtual transmitted data length (DONE_LEN) is equal to DONE-LEN+(MTU-IPHL) (step 316).

Thereafter, it is judged whether the untransmitted data length is less than or equal to the fragment payload length, namely, the fragment is final (step 313). Herein, if the fragment is final, the final frame is obtained by subtracting DONE_LEN from the transmit data length (step 318). Thereafter, the number of frames is counted up (FLM_COUNT++) for the final fragment frame (step 319), and the number of frames, head frame payload length, middle frame payload length, and final frame payload length are decided and outputted (step 310).

Where the connection type is RAW, the number of frames is one, and the frame payload length should fall within a range of MTU-IPHL. Otherwise, the transmit data may be cut off and transmitted. Alternatively, an error response may be returned to the application device 101 (steps 308, 309).

When the connection type is TCP, MSS is acquired because MSS is basic for the frame length (step 320). Next, the virtual transmitted data size (DONE_LEN) is initialized to zero (step 321). It is checked whether or not the (virtual) untransmitted data size is less than or equal to MSS (step 322). Herein, if the untransmitted data size is less than or equal to MSS, it is judged that the given transmit data is completely transmitted in the next one segment. Also, if the untransmitted data size is more than MSS, the number of frames is incremented (step 322), and it is determined whether the transmitted data is the head segment (this determination is made based on whether or not DONE_LEN is 0) (step 324). If the transmitted data is the head segment, the head frame length is equal to MSS and DONE_LEN is equal to MSS (step 326).

Again, it is confirmed whether or not the virtual untransmitted data length is less than or equal to MSS. If the virtual untransmitted data length is more than MSS, the number of frames is counted up, and this time, the middle frame payload length is equal to MSS and the transmitted data length is DONE_LEN=DONE_LEN+MSS (step 325). Again, it is confirmed whether or not the untransmitted data length is less than or equal to MSS. Herein, if it is judged that the segment is final, the final frame length as the final frame is equal to the value of the transmit data length minus DONE_LEN (step 327). And the final frame is counted up as the transmitted frame count (step 328).

As described above, the number of frames, the head frame payload length, the middle frame payload length, and the final frame payload length are decided and outputted (step 310). These four values, regarding the number of frames and the frame length, are outputted to a payload separation part 103, a protocol control part 115 and a header/payload synthesis part 120.

[Expected Timing of Frame Count Frame Length Calculation Part (FFC)]

In this communication control device, first of all, the number of frames and the frame length are calculated based on the transmission request 106 and the transmission data length 107 from the application device 101, and then the payload division and the header generation are started. This is aimed to start the payload division and the header generation at the same time.

Figure 2:
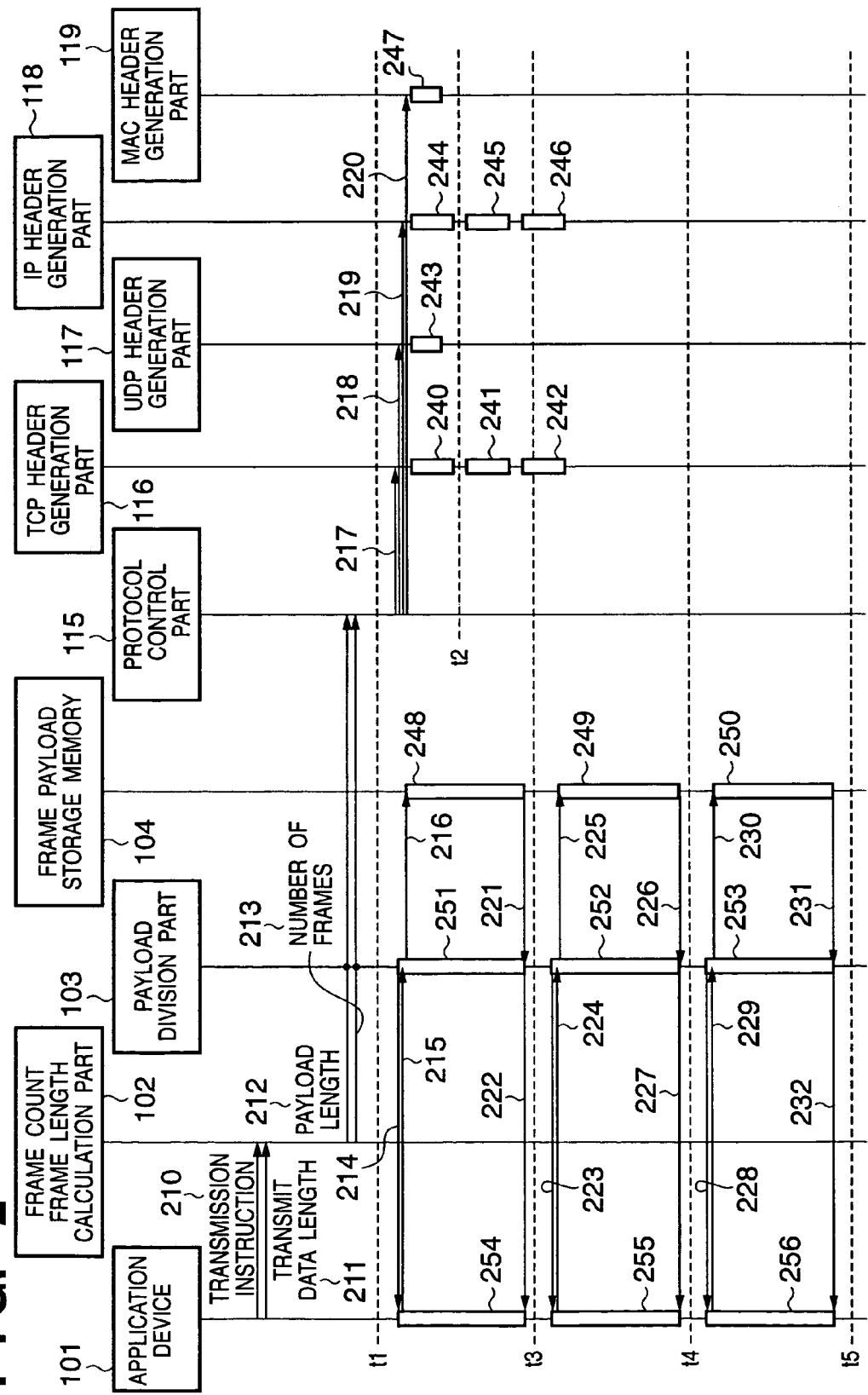
FIG. 2 is a chart showing the sequence 1.

Referring to FIG. 2, the simultaneous start of the payload division and the header generation will be described below. If the application device 101 transmits a transmission instruction 210 and a transmit data length 211 to the FFC 102 (supposing that these two transmissions occur synchronously at the same time), the FFC 102 calculates the payload length and the number of frames in accordance with the above-mentioned procedure. The FFC 102 sends them to the payload division part 103 and the protocol control part 115 (also to the header/payload synthesis part 120, which is omitted in the explanation of FIG. 2).

Also, it is supposed that the payload length 212 and the number of frames 213 are transmitted synchronously at the same time, and received substantially at the same time by the payload division part 103 and the protocol control part 115. This reception time is assumed to be t1. From the time t1, the payload division part 103 starts to receive data from the application device 101, and the header generation part starts to generate the header. If the payload division part 103 starts (214) to receive the transmit data from the application device 101, the application device 101 sends sequentially the transmit data from the head to the payload division part 103. At this time, the application device 101 and the payload division part 103 transmit and receive data synchronously.

For example, the transmit data from the application device 101 has the length of three frames, the transmission time of data from the application device 101 is indicated by 254, 255 and 256. When data is sent from the application device 101 to the payload division part 103, the end time of transmitting data of the length corresponding to the first frame is t3. Also, the end time of transmitting data of the length corresponding to the second frame is t4, and the end time of transmitting data of the length corresponding to the third frame is t5. In FIGS. 2, 254, 255 and 256 indicates the required time for sending data up to frame breakpoint from the application device 101 to the payload division part 103. However, the application device 101, which is not aware of frame breakpoint, sends the data to the payload division part 103 consecutively (synchronously, such as 222, 227 and 232).

The payload division part 103 divides the data received consecutively from the application device into frame units, and stores the application data of frame units in the frame payload storage memory 104 (216, 225, 230).

On the other hand, if the protocol control part 115 receives the payload length 212 and the number of frames 213, it issues a request for generating the header to each of the header generation parts 116, 207, 208 and 209 from the time t1 to start the header generation. Since the payload length 212 and the number of frames 213 are known to each header generation part, the header generation can be performed, before the frame payload is received from the application device 101. In FIG. 2, the period for header generation is indicated by 240, 241, 242, 243, 244, 245, 246 and 247. For illustration, it is supposed here that the headers are generated for three frames per one transmit data. The length of header generated here is a few bytes or from 20 to 30 bytes for each of the TCP, UDP, IP, MAC headers.

On the contrary, it is supposed that the payload length of one frame or segment is from several hundreds to about 1500 bytes (when the interface layer is Ethernet). That is, the time for which the header generation part generates the header will be sufficiently shorter than the time t3 when the transmit data of one frame is completely received from the application device 101, in which the header generation completion time of the first frame is indicated by t2. Also, even if the headers for the second and third frames are generated, there is possibility that all the headers have been generated near or far before the time t3. That is, the first frame is transmittable at the time t3.

By the way, a check sum problem arises here. Most of the header can be generated without depending on the payload, but the datagram check sum or IP packet check sum must be calculated from the transmit data (payload). The UDP has an option of invalidating the check sum, in which the header generation and the payload division for UDP and IP can be performed in parallel completely independently, as shown in FIG. 2.

Figure 4:
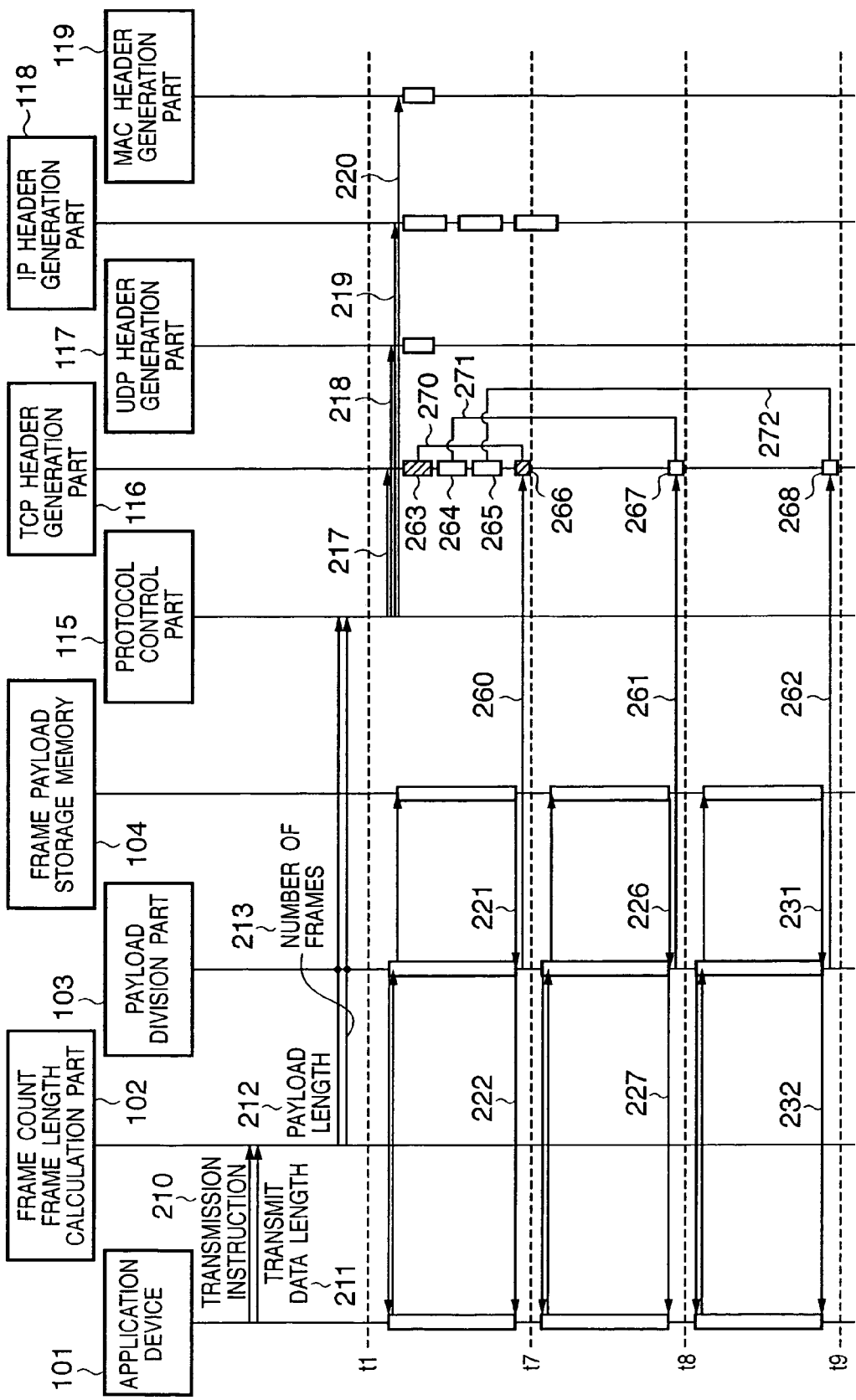
FIG. 4 is a chart showing the sequence 3.

Even when the check sum of the TCP header is considered, the independent parallel processing of the header generation and the payload division in this embodiment can contribute to higher throughput. Referring to FIG. 4, this will be described below.

If the time of receiving data of one segment from the application device 101 is t7, the check sum value of one segment can be calculated immediately before the time t7. If the TCP header generation for the first segment is completed by adding the segment check sum calculated immediately before the time t7 to the TCP header of the first segment generated in the period 263 immediately after the time t1, the first segment is transmittable immediately after the time t7. Also, immediately before the time t8, like the time t7, the check sum value of the second segment can be calculated. Whereby, the second TCP header is completed by adding the check sum value to the second TCP header generated in advance in the period 264, and immediately after the time t8, the second segment is transmittable. Further, immediately after the time t9, the third segment is transmittable.

Figure 3:
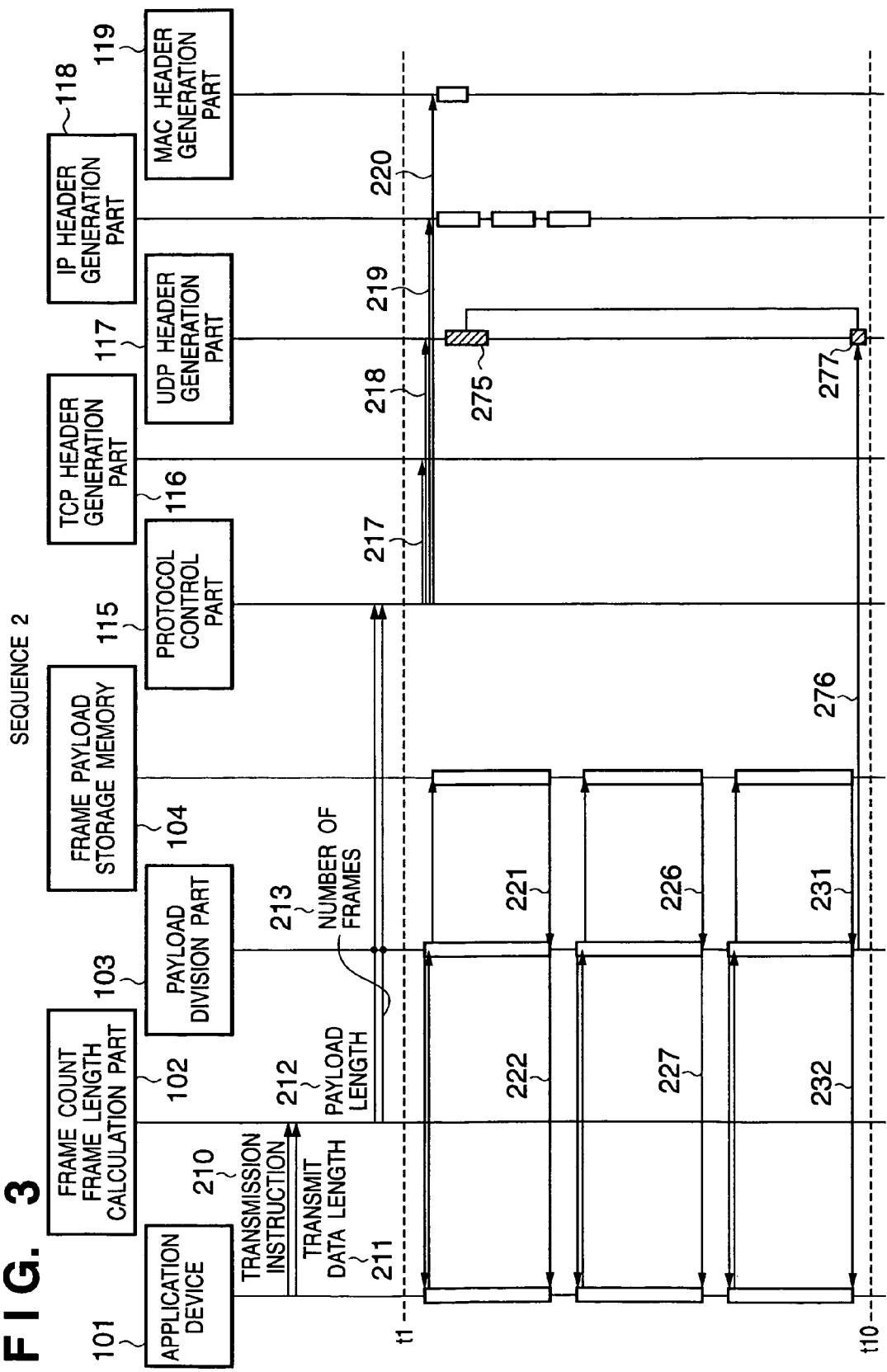
FIG. 3 is a chart showing the sequence 2.

An instance of considering the datagram check sum of the UDP header is shown in FIG. 3. Even if the UDP header for datagram is generated in advance in the period 275 immediately after the time t1, the datagram check sum of one datagram is calculated at the time t10 when the payload division part 103 completes receiving all the datagram from the application device 101. At this time, the UDP datagram check sum is added to the UDP header generated in advance, and the UDP frame is sent out immediately after time t10. In this case, since the second and third frames are already completely generated, the second and third frames are transmittable immediately after transmitting the first frame. Also, if it is unnecessary to send out the frames in the fixed sequence, the first frame with the UDP header may be sent out after the second and third frames.

[Division of Payload Division Part]

The payload division part 103 divides the transmit data 110 given from the application device 101, based on the inputs 109 regarding the number of frames and the frame length given from the FFC 102. At the same time, the payload division part 103 writes the frame payload 111 in a payload TX memory 104. The payload division part 103 makes a transmission preparation completion notice 136 of frame payload to the header/payload synthesis part 120, after completion of writing the frame payload.

[Check Sum of Payload Division Part]

When the payload division part 103 writes the transmit data in the payload TX memory 104, the check sum of frame payload is obtained for every frame, and the check sum value 135 is passed to a UDP header generation part 117 and a TCP header generation part 116.

[TX Memory]

Figure 5:
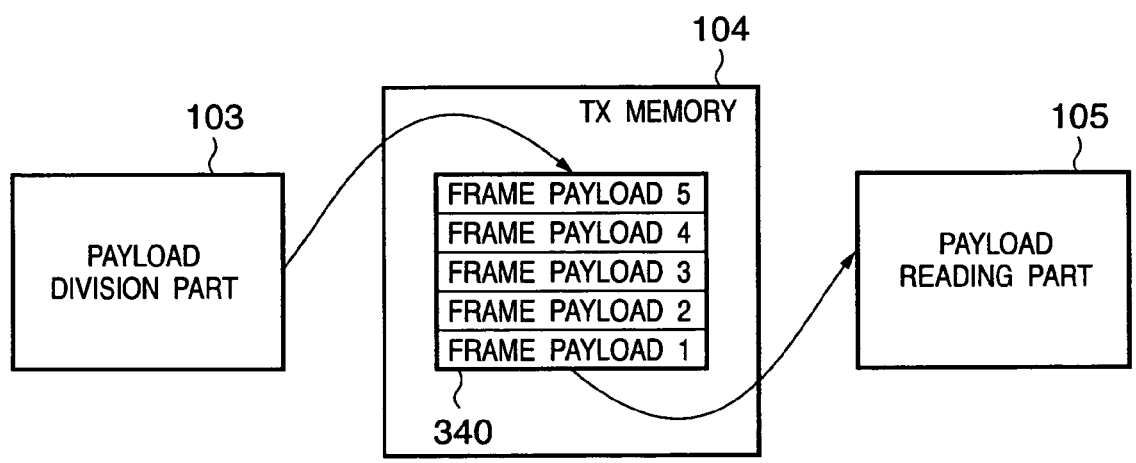
FIG. 5 is a diagram showing a TX memory.

The TX memory 104 stores one series of transmit data with one transmission request as a row of frame payloads in the frame payload FIFO for every transmission request. As shown in FIG. 5, one FIFO 340 is assigned for one transmission request inside the TX memory 104. In an example of FIG. 5, the transmit data with one transmission request is composed of five frame payloads.

In the example of FIG. 5, frame payload 1 (head frame) to frame payload 5 (last frame) are stored in the FIFO. When transmission occurs in a unit of frame, five frames are not accumulated in this way. Each frame payload may be extracted and transmitted by a payload reading part 105 immediately after being inserted into the FIFO.

[Payload Reading Part]

The payload reading part 105 takes out one frame payload 113 to be transmitted from the TX memory 104, and outputs it to the header/payload synthesis part 120, upon one payload reading instruction 114 from the header/payload synthesis part 120.

[Protocol Control Part]

The protocol control part 115 receives four values 108 of the number of frames, payload length of head frame, payload length of middle frame, and payload length of final frame from the FFC 102, then judges whether or not the transmission frame is TCP or UDP. The protocol control part 115 collects the information for generating the protocol header required for frame transmission, and simultaneously distributes the header generation instruction and the header generation information to each of the protocol header generation parts 116 to 119. Various kinds of information to be collected are set statically, or retrieved dynamically from the table. The examples of dynamic table may include an address table for indexing the destination IP address, originated IP address, destination port and originated port, which are associated with connection, and a routing table of IP.

Figure 6:
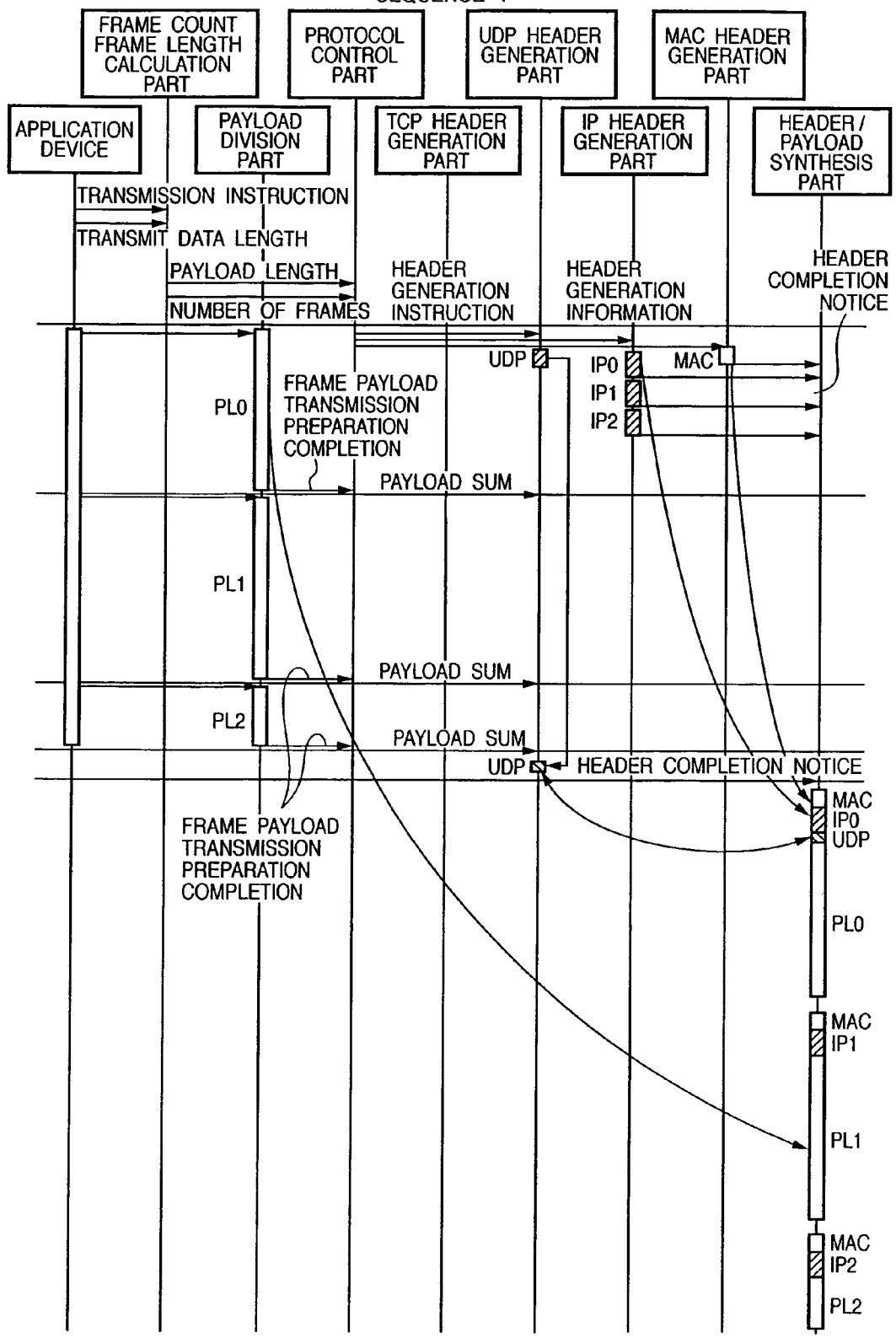
FIG. 6 is a chart showing the sequence 4.

FIG. 6 shows an instance where the transmission datagram is divided into three fragment frames when transmitting the UDP/IP frame. The protocol control part 115 judges, upon a notice 108 from the FFC 102, that the protocol type is UDP, the number of frames is three, and the payload length is length PL0 for the head frame, length PL1 for the middle frame and length PL2 for the final frame. Next, the information required for generating the UDP, IP and MAC headers is collected, and the header generation information 123 to 125, together with the header generation instruction, is outputted to each protocol header generation part.

The header generation information 123 is outputted to the UDP header generation part 117. The header generation information 123 includes the originated port number, destination port number and UDP data length. The header generation information 124 is outputted to an IP header generation part 118. The header generation information 124 includes the header generation number 3, header length, TOS, identifier, TTL, protocol, originated IP address and destination IP address for one frame, and the total length, flag and fragment offset for three frames. At this time, the total length is outputted as the value of summing the IP header length, UDP header length and PL0 for the head frame, the IP header length and PL1 for the middle frame, and the IP header length and PL2 for the final frame. The header generation information 125 outputted to a MAC header generation part 119 includes the header generation number 3, destination MAC address, originated MAC address and type length for one frame.

Figure 7:
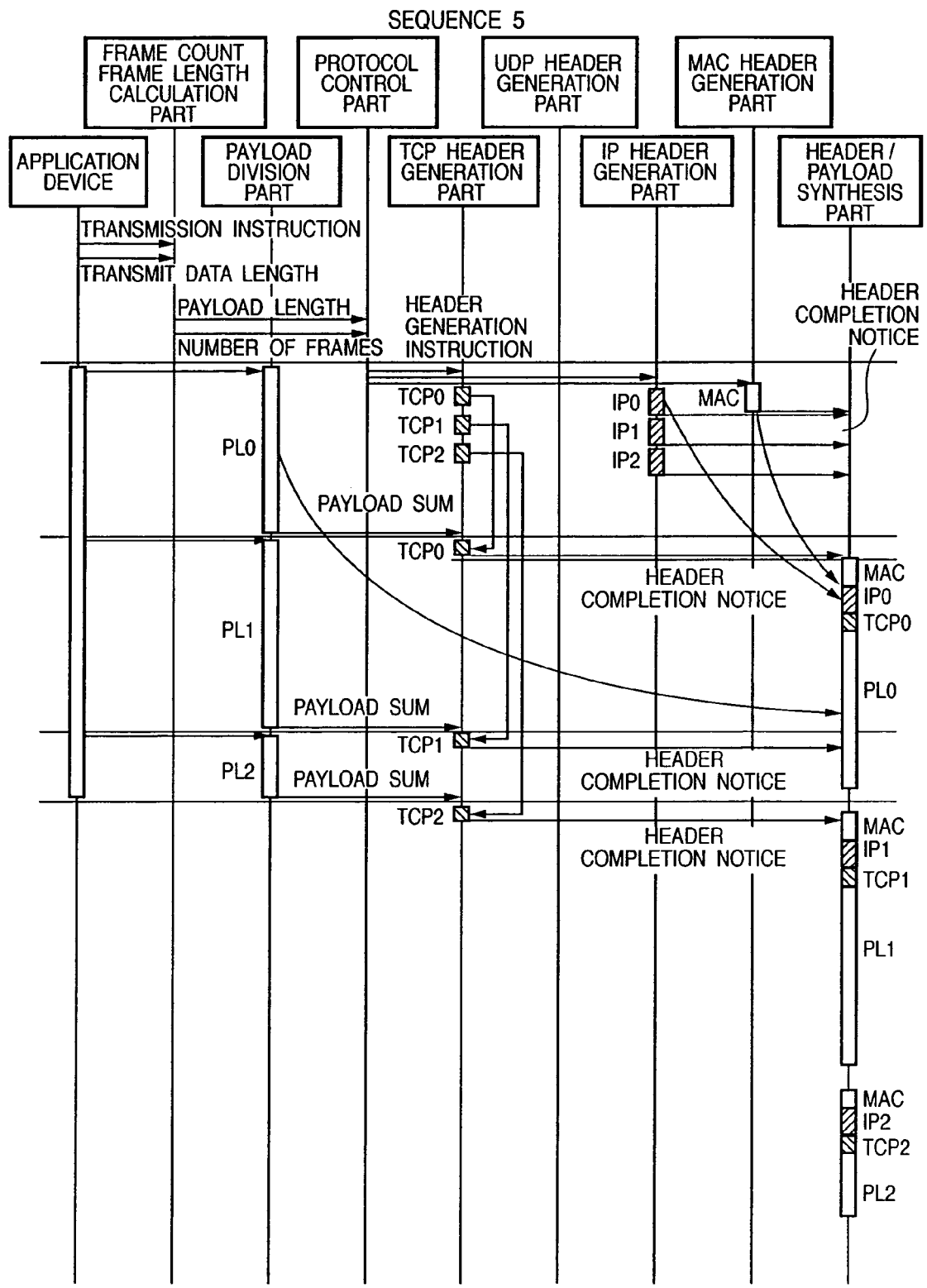
FIG. 7 is a chart showing the sequence 5.

FIG. 7 shows an instance where the transmission datagram is divided into three segments when transmitting the TCP/IP frame. The protocol control part 115 judges, upon a notice from the FFC 102, that the protocol type is TCP, the number of frames is three, and the payload length is PL0 for the head frame, PL1 for the middle frame and PL2 for the final frame. Next, the information required for generating the TCP, IP and MAC headers is collected, and the header generation information, together with the header generation instruction, is outputted to each protocol header generation part.

The header generation information 122 outputted to the TCP header generation part 116 includes the header generation number 3, originated port number, destination port number, sequence number, acknowledgement number, header length, flag bit, window size and emergency pointer for three frames. The header generation information 124 outputted to the IP header generation part 118 includes the header generation number 3, header length, TOS, flag, offset, TTL, protocol, originated IP address and destination IP address for one frame, and the total length and identifier for three frames. At this time, the total length is outputted as the value of summing the IP header length, TCP header length and PL0 for the head frame, the IP header length, TCP header length and PL1 for the middle frame, and the IP header length, TCP header length and PL2 for the final frame. The header generation information 125 outputted to the MAC header generation part 119 includes the header generation number 3, destination MAC address, originated MAC address and type length for one frame.

[TCP Header Generation Part]

Figure 8:
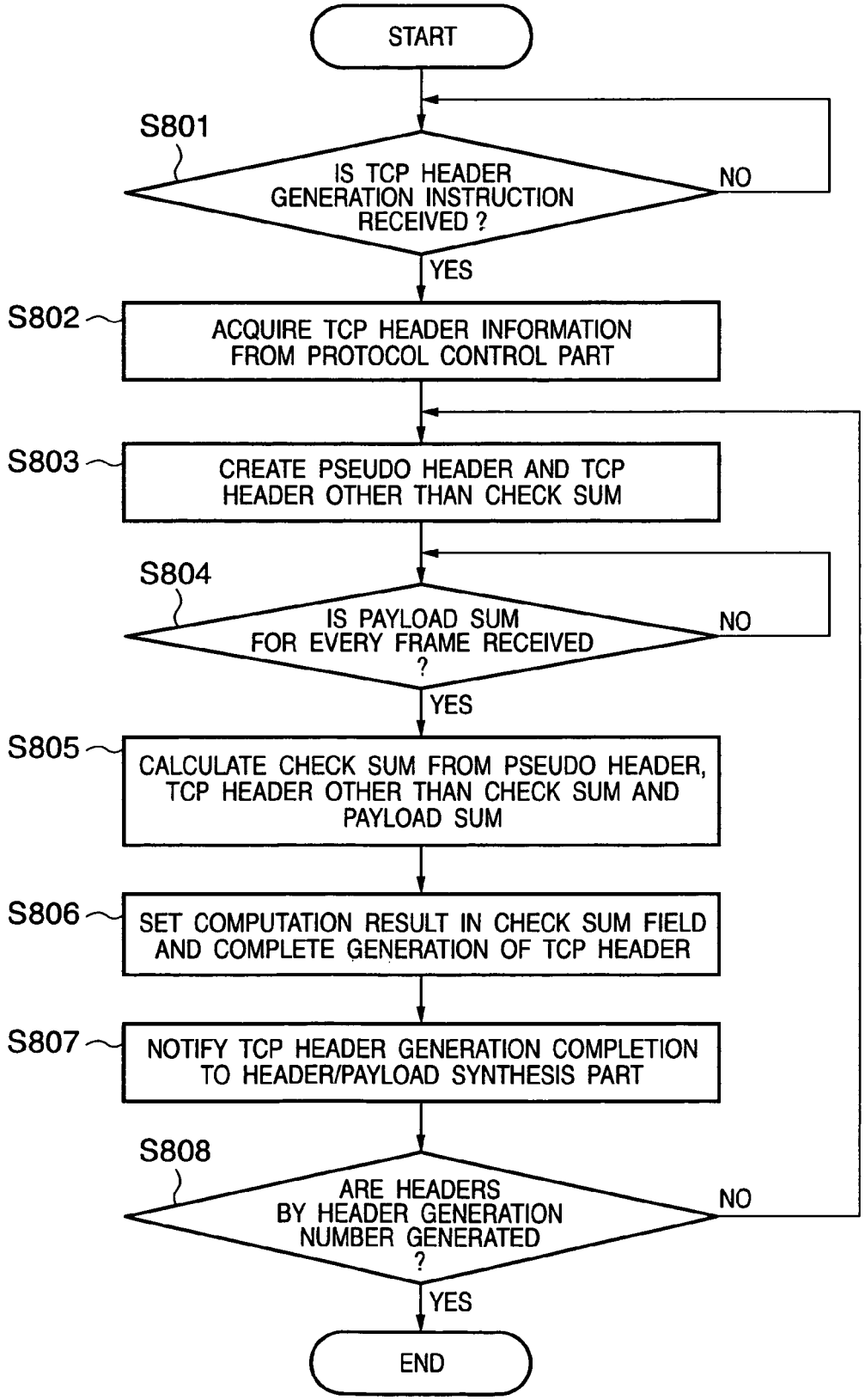
FIG. 8 is a flowchart showing a process of a TCP header generation part.

The TCP header generation part 116 starts to generate the header based on a header generation instruction and the header generation information from the protocol control part 115, and makes a TCP header generation completion notice 126 to the header/payload synthesis part 120 after completion of header generation. FIG. 8 shows a flowchart for generating the header.

At step S801, it is confirmed whether or not a TCP header generation instruction is received from the protocol control part 115. Herein, if the TCP header generation instruction is received, the TCP header information is acquired from the protocol control part 115 (step S802). The TCP header information includes as follows.

That is, the header generation number, originated port number, destination port number, sequence number, acknowledgement number, header length, flag bit, window size and emergency pointer for the number of header generation, and destination IP address, originated IP address, and segment length for the pseudo header. The segment length is length that TCP header length and payload length are added. And the pseudo header and the TCP header other than check sum are created from the acquired header generation information (step S803).

Next, it is judged whether or not the payload sum for every frame is received from the payload division part 103. If received (step S804: Yes), the payload sum of TCP is calculated from the pseudo header, the TCP header other than check sum and the payload sum (step S805). The check sum calculated at step S805 is set in a check sum field of the TCP header at step S806, completing the generation of the TCP header for one frame. If the generation of the TCP header for one frame is completed, a TCP header generation completion notice 126 is issued to the header/payload synthesis part 120 at step S807. It is judged whether or not the headers are generated by the number of generating the header (step S808). Herein, if the headers are not generated by the number of generating the header (step S808: No), the procedure returns to step S803 to start to generate the next header.

Figure 14:
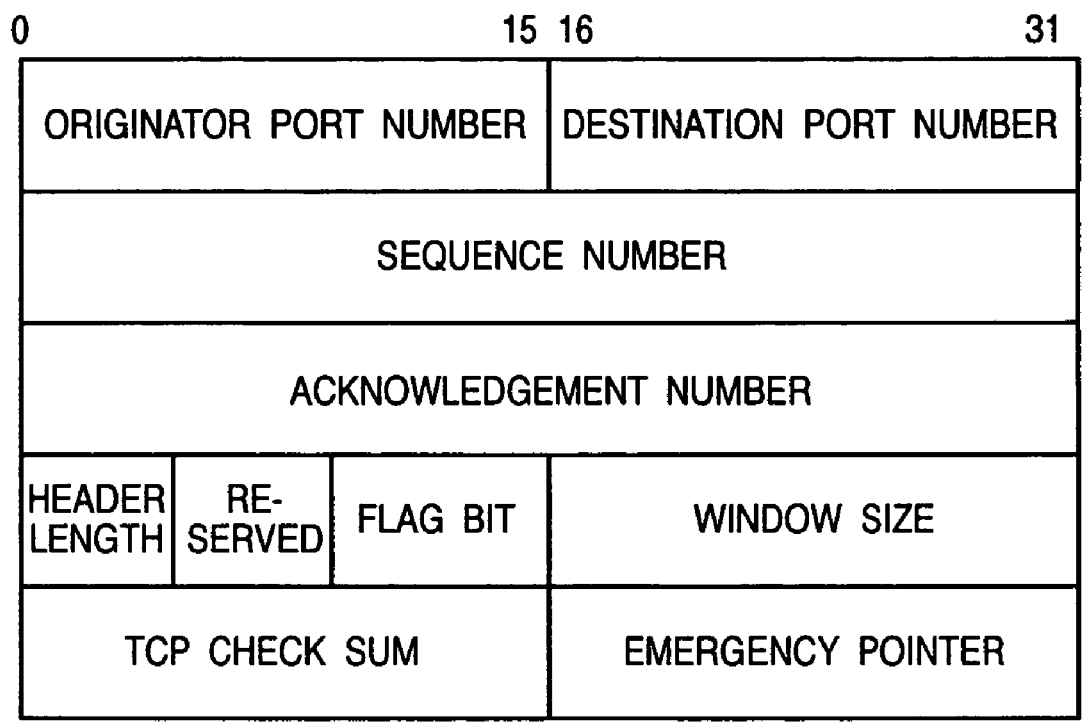
FIG. 14 is a diagram showing a TCP header format.
Figure 15:
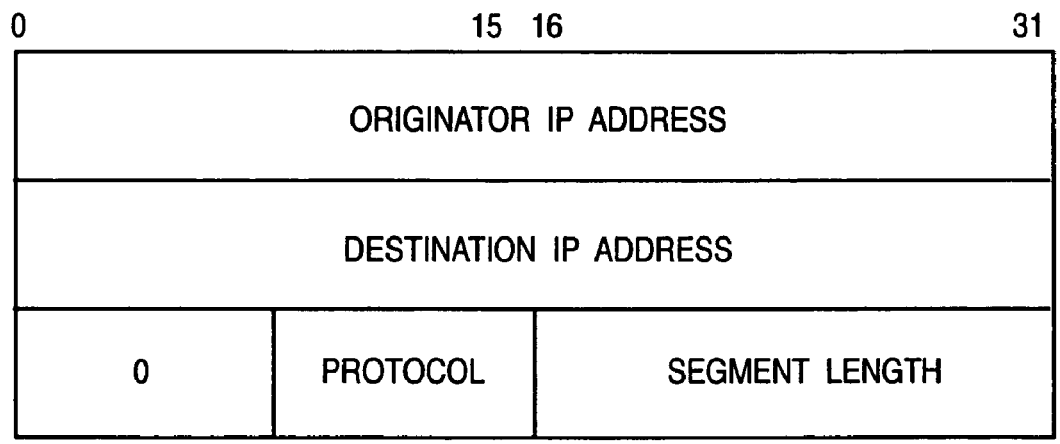
FIG. 15 is a diagram showing a TCP pseudo header format.

Also, if the headers are generated by the number of generating the header (step S808: Yes), all the TCP headers that must be appended to the transmission datagram are created, whereby the generation of TCP header is ended. FIG. 14 shows the format of header created by the TCP header generation part 116, and FIG. 15 shows the pseudo header format.

Also, the TCP header generation part 116 receives an output request 126 from the header/payload synthesis part 120, and outputs the TCP headers 130 to the header/payload synthesis part 120 in the generated sequence.

[UDP Header Generation Part]

Figure 9:
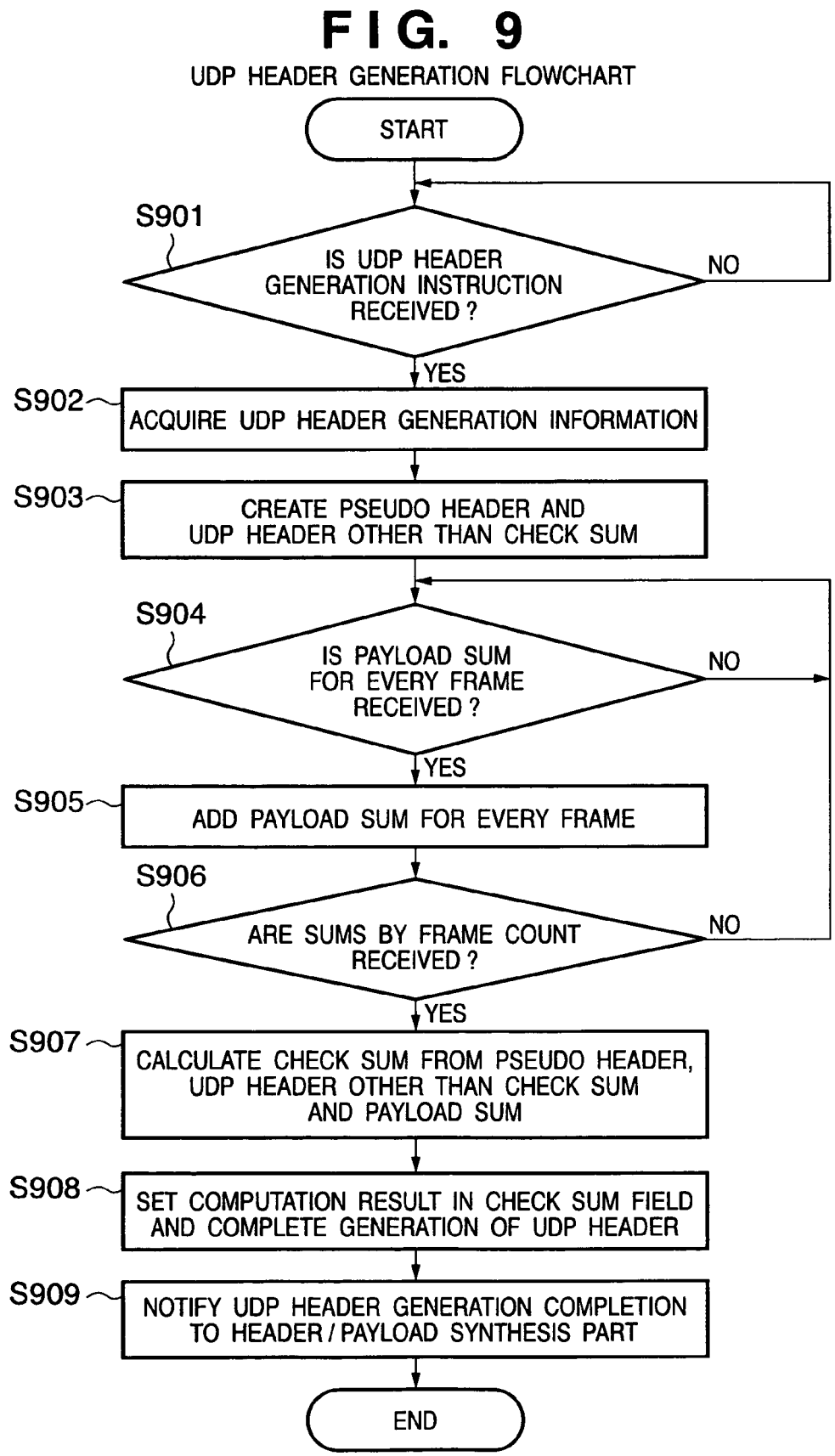
FIG. 9 is a flowchart showing a process of a UDP header generation part.

The UDP header generation part 117 starts to generate the header based on a header generation instruction and the header generation information from the protocol control part 115, and makes a UDP header generation completion notice 127 to the header/payload synthesis part 120 after completion of header generation. FIG. 9 shows a flowchart for generating the header.

At step S901, it is confirmed whether or not a UDP header generation instruction is received from the protocol control part 115. Herein, if the UDP header generation instruction is received, the UDP header generation information is acquired from the protocol control part 115 (step S902). The UDP header generation information includes the number of frames, originated port number, destination port number and UDP data length. The pseudo header and the UDP header other than check sum are created from the acquired header generation information (step S903).

Next, it is judged whether or not the payload sum for every frame is received from the payload division part 103. If received (step S904: Yes), the payload sum for every frame is added at step S905. And at step S906, it is judged whether or not the payload sums by the number of frames are received from the payload division part 103. Herein, if all the payload sums are not received (step S906: No), the procedure returns to step S904, and enters a wait state for receiving the next frame payload.

Figure 16:
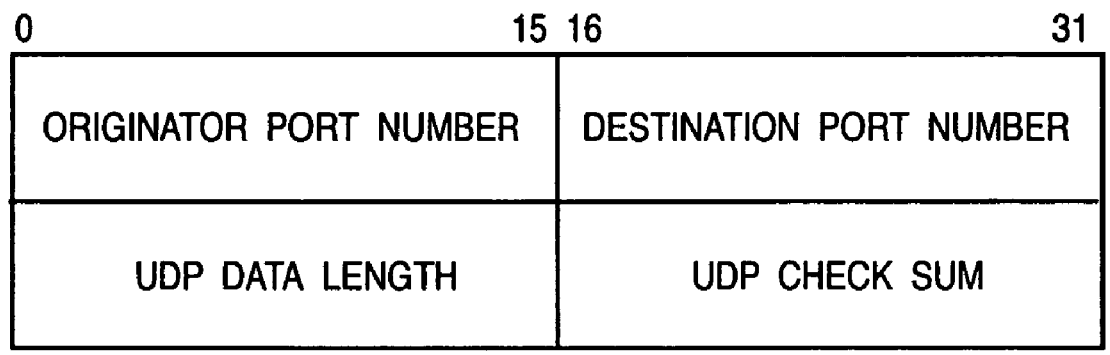
FIG. 16 is a diagram showing a UDP header format.
Figure 17:
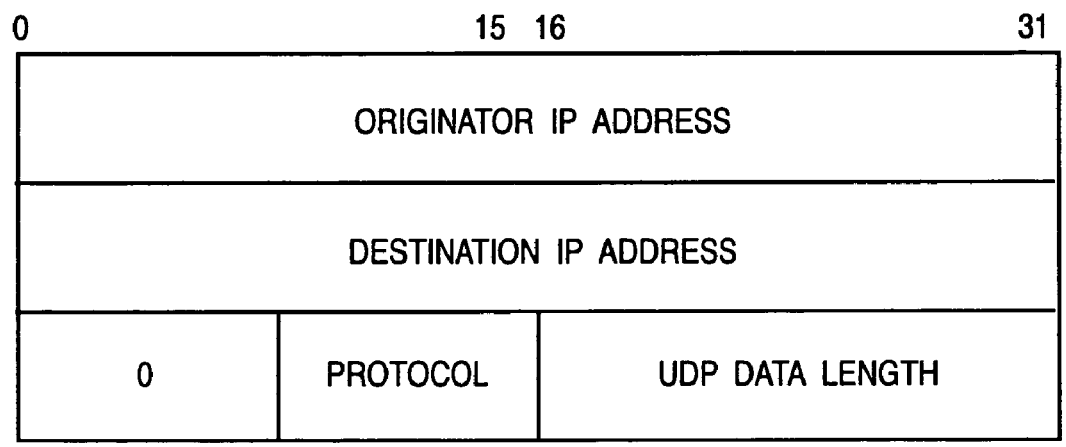
FIG. 17 is a diagram showing a UDP pseudo header format.

Also, if all the payload sums are received (step S906: Yes), the UDP check sum is calculated from the total sum of the pseudo header, the UDP header other than the check sum and the payload sum at step S907. The check sum calculated at step S907 is set in a check sum field of the UDP header at step S908, completing the generation of the UDP header. If the generation of the UDP header is completed, a UDP header generation completion notice 127 is issued to the header/payload synthesis part 120 at step S909, whereby the generation of UDP header is ended. FIG. 16 shows the format of header created by the UDP header generation part 117, and FIG. 17 shows the pseudo header format.

Also, the UDP header generation part 117 receives an output request 127 from the header/payload synthesis part 120, and outputs the generated UDP header 131 to the header/payload synthesis part 120.

[IP Header Generation Part]

Figure 10:
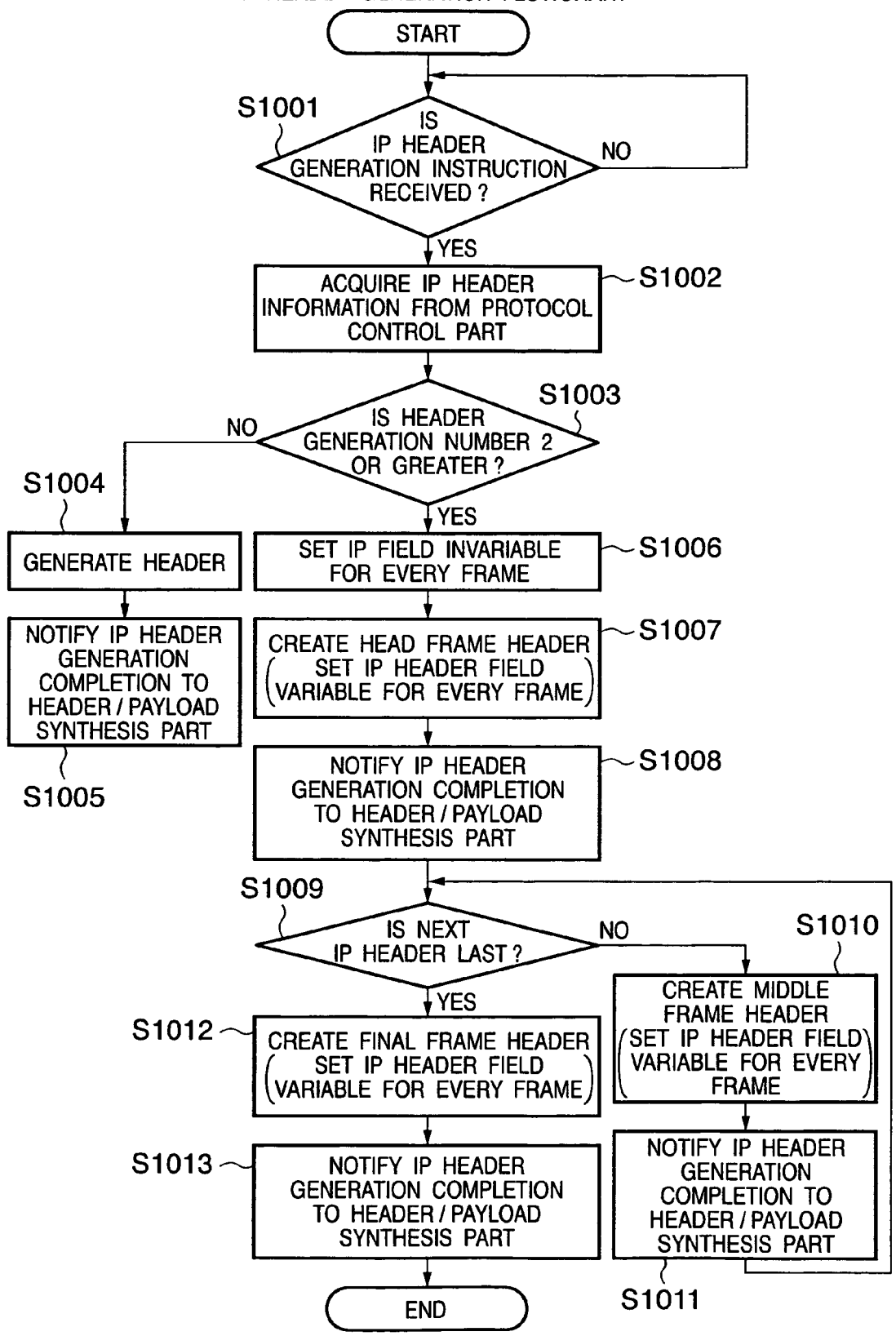
FIG. 10 is a flowchart showing a process of an IP header generation part.

The IP header generation part 118 starts to generate the header based on a header generation instruction and the header generation information from the protocol control part 115, and makes an IP header generation completion notice 128 to the header/payload synthesis part 120 after completion of header generation. FIG. 10 shows a flowchart for generating the header.

At step S1001, it is confirmed whether or not an IP header generation instruction is received from the protocol control part 115. Herein, if the IP header generation instruction is received, the IP header information is acquired from the protocol control part 115 (step S1002). At step S1003, it is judged whether or not the number of generating the header is two or more. Herein, when the number of generating the header is two or more, it is meant that the datagram is segmented in the case of TCP, and the datagram is fragmented in the case of UDP.

If the number of generating the header is not two or more (step S1003: No), an IP header is generated from the header generation information (step S1004). And an IP header generation completion notice 128 is issued to the header/payload synthesis part 120 (step S1005), whereby the generation of IP header is ended.

Figure 18:
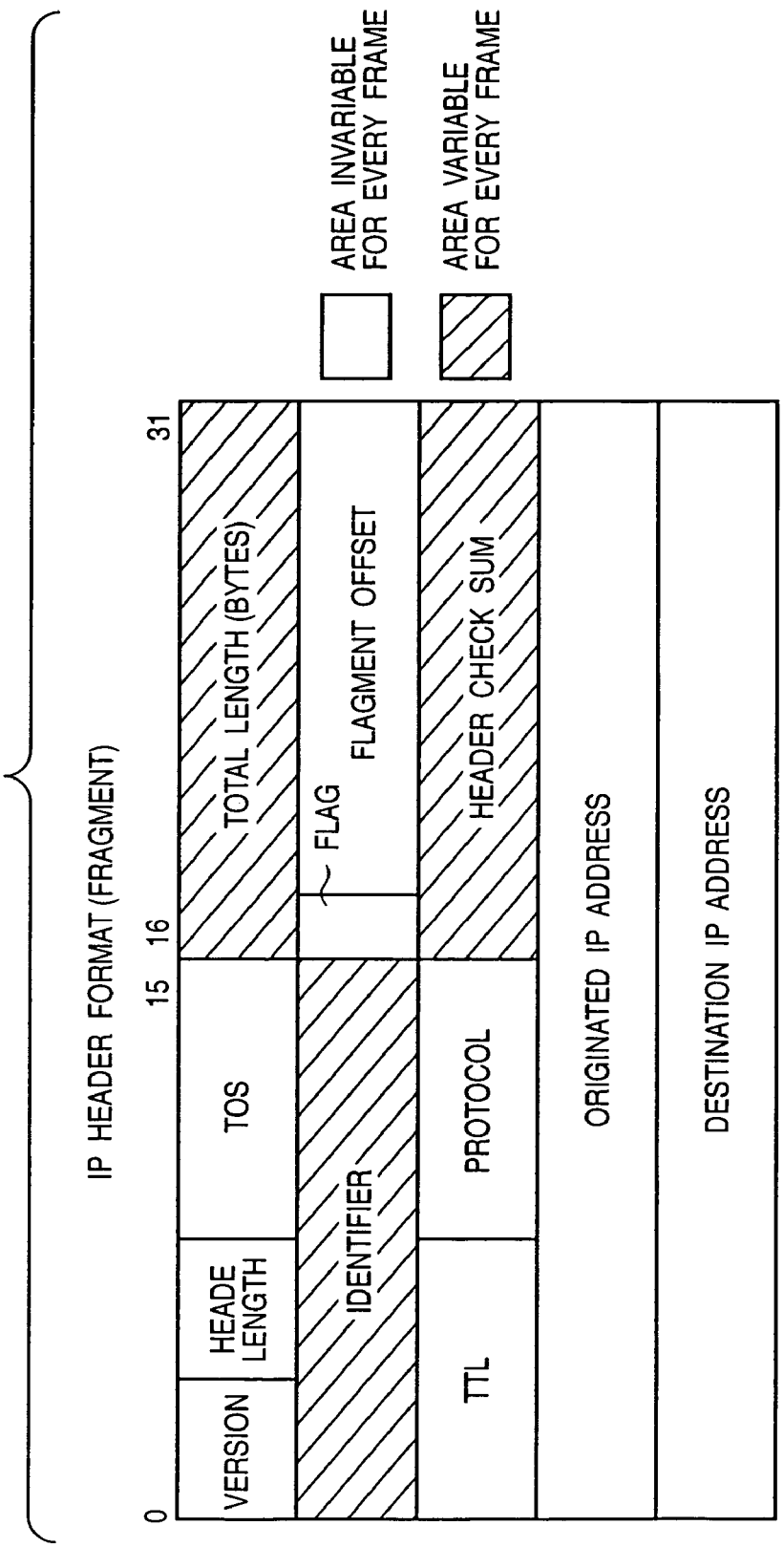
FIG. 18 is a diagram showing an IP header format (fragment)
Figure 19:
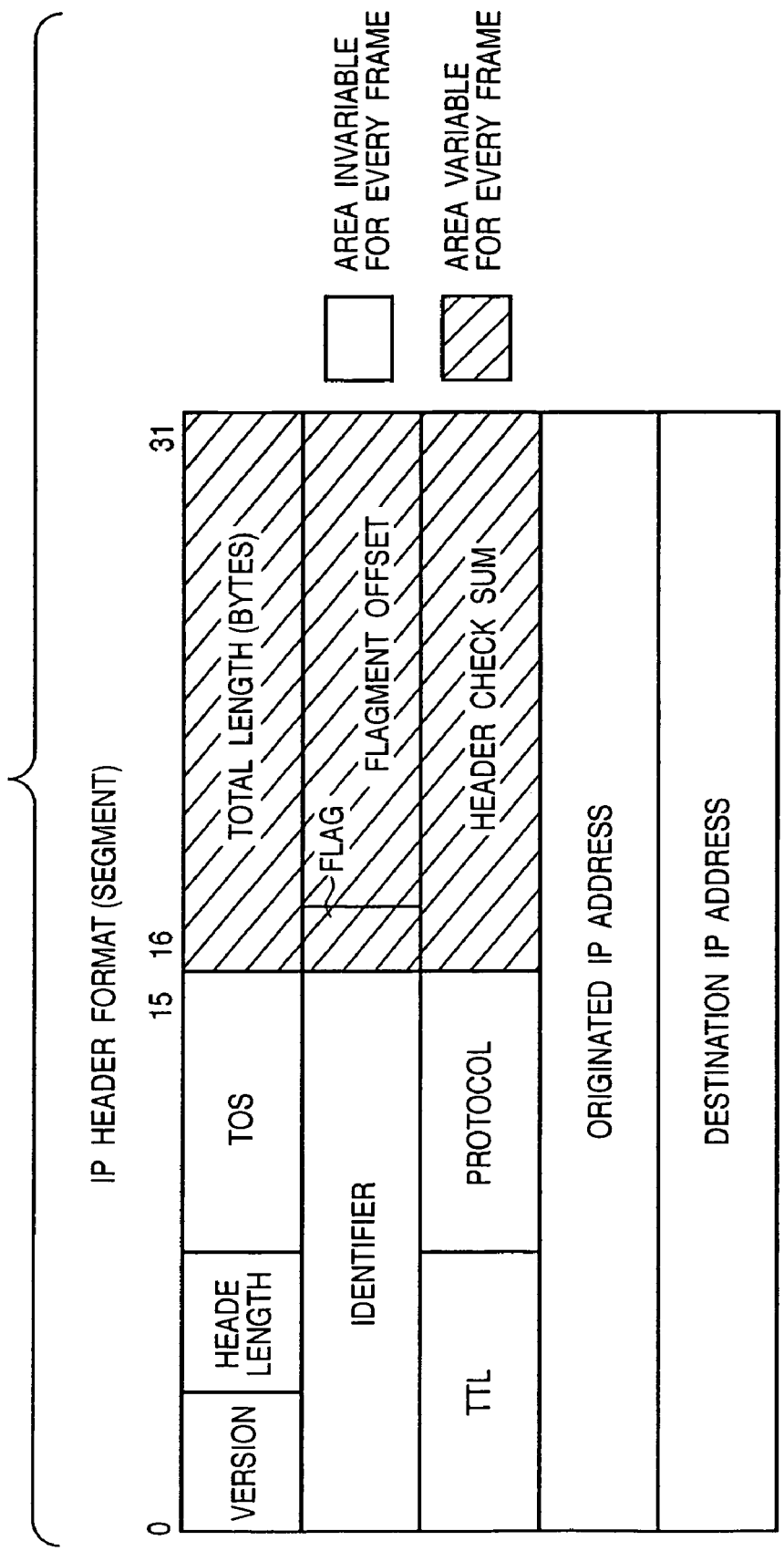
FIG. 19 is a diagram showing an IP header format (segment)

Also, if the number of generating the header is two or more (step S1003: Yes), an IP header field that is invariable for every frame is firstly set (step S1006). The IP header field invariable for every frame indicates the version, header length, TOS, flag, fragment offset, TTL, protocol, originated IP address, and destination IP address, when the upper-level layer is TCP. The IP header field invariable for every frame indicates the version, header length, TOS, identifier, TTL, protocol, originated IP address, and destination IP address, when the upper-level layer is UDP (see FIGS. 18 and 19).

Next, at step S1007, the IP header field variable for every frame is set for the head frame. The IP header field variable for every frame includes the total length, identifier, and header check sum, when the upper-level layer is TCP, or includes the total length, flag, fragment offset, and header check sum, when the upper-level layer is UDP (see FIGS. 18 and 19). If the setting of the IP header field variable for every frame is ended, an IP header generation completion notice 128 is issued to the header/payload synthesis part 120 at step S1008.

Next, at step S1009, it is judged whether or not the next generated IP header is involved in the segmented or fragmented last frame. Herein, if the next generated IP header is not last (step S1009: No), the IP header field variable for every frame in the middle frames is set at step S1010. And at step S1011, an IP header generation completion notice 128 is issued to the header/payload synthesis part 120. Again, it is judged whether the next IP header is last (step S1009).

Herein, if the next generated IP header is last, the IP header field variable for every frame in the last frame is set at step S1012. And at step S1013, an IP header generation completion notice 128 is issued to the header/payload synthesis part 120 at step S1013, whereby the generation of IP header is ended because all the IP headers that must be appended to the transmission datagram are generated.

Also, the IP header generation part 118 receives an output request 128 from the header/payload synthesis part 120, and outputs the IP headers 132 to the header/payload synthesis part 120 in the generated sequence.

[MAC Header Generation Part]

Figure 21:
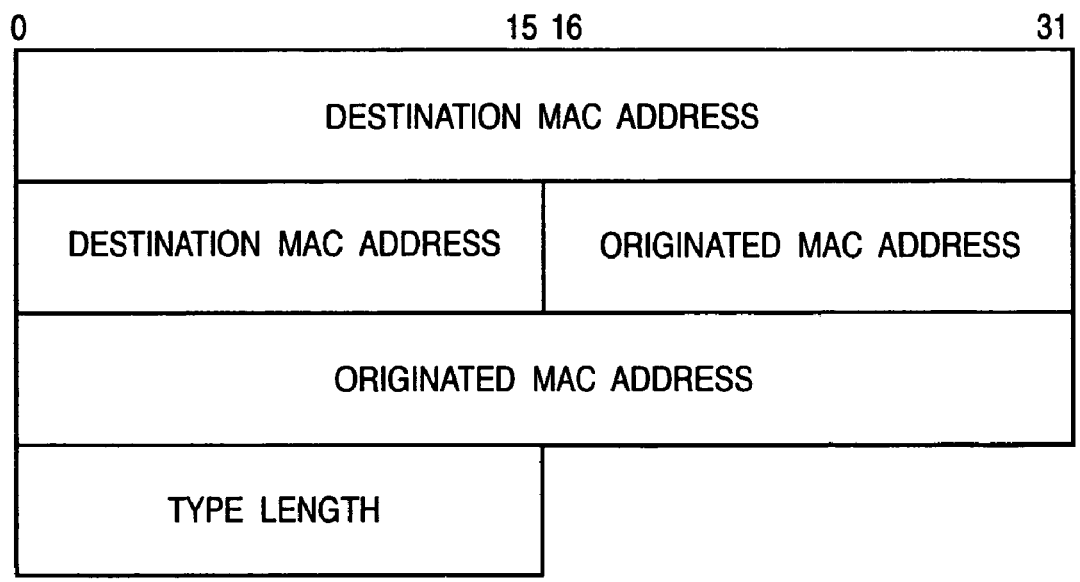
FIG. 21 is a diagram showing a MAC header format.

The MAC header generation part 119 starts to generate the header based on a header generation instruction and the header generation information from the protocol control part 115, and makes a MAC header generation completion notice 129 to the header/payload synthesis part 120 after completion of header generation. The MAC header generation part 119 receives a MAC header generation instruction from the protocol control part 115, and acquires the MAC header information. The MAC header generation information includes the header generation number, originated MAC address, destination MAC address and type length. When one transmission datagram needs to generate a plurality of MAC headers due to fragmentation or segmentalization, the contents of its header are the same. Whereby, if the generation of one MAC header is completed, a MAC header generation completion notice 129 is issued to the header/payload synthesis part 120 by the number of generating the header. FIG. 21 shows the format of MAC header created by the MAC header generation part 119.

Also, the MAC header generation part 119 receives an output request 129 from the header/payload synthesis part 120, and outputs the generated MAC headers 133 to the header/payload synthesis part 120.

[Header/Payload Synthesis Part]

The header/payload synthesis part 120 deduces the number of headers to be generated from the number of frames from the FFC 102. Next, it is recognized that the preparation for the header and payload necessary for the transmission frame is completed, based on a header completion notice from each protocol header generation part and a payload transmission preparation completion notice from the payload division part 103. And in the case of TCP/IP, the header/payload synthesis part makes an output request to the MAC header generation part 119, the IP header generation part 118, the TCP header generation part 116 and the payload reading part 105 in this order, reads the header and payload, synthesizes them as a frame, and outputs the frame to the frame sending part 121. In the case of UDP/IP, the header/payload synthesis part makes an output request to the MAC header generation part 119, the IP header generation part 118, the UDP header generation part 117 and the payload reading part 105 in this order for the head frame. The header/payload synthesis part makes an output request to the MAC header generation part 119, the IP header generation part 118 and the payload reading part 105 in this order for the middle and last frames. And the header/payload synthesis part reads the header and payload, synthesizes them as a frame, and outputs the frame to the frame sending part 121. When the frame without payload is transmitted, the header/payload synthesis part reads the header only, synthesizes it as a frame, and outputs the frame to the frame sending part 121.

[Frame Sending Part]

The frame sending part 121 has a function of sending the frame outputted from the header/payload synthesis part 120 out of the communication control device. It makes the addition of preamble, frame padding, and generation of CRC conforming to IEEE802.3.

Second Embodiment

Figure 11:
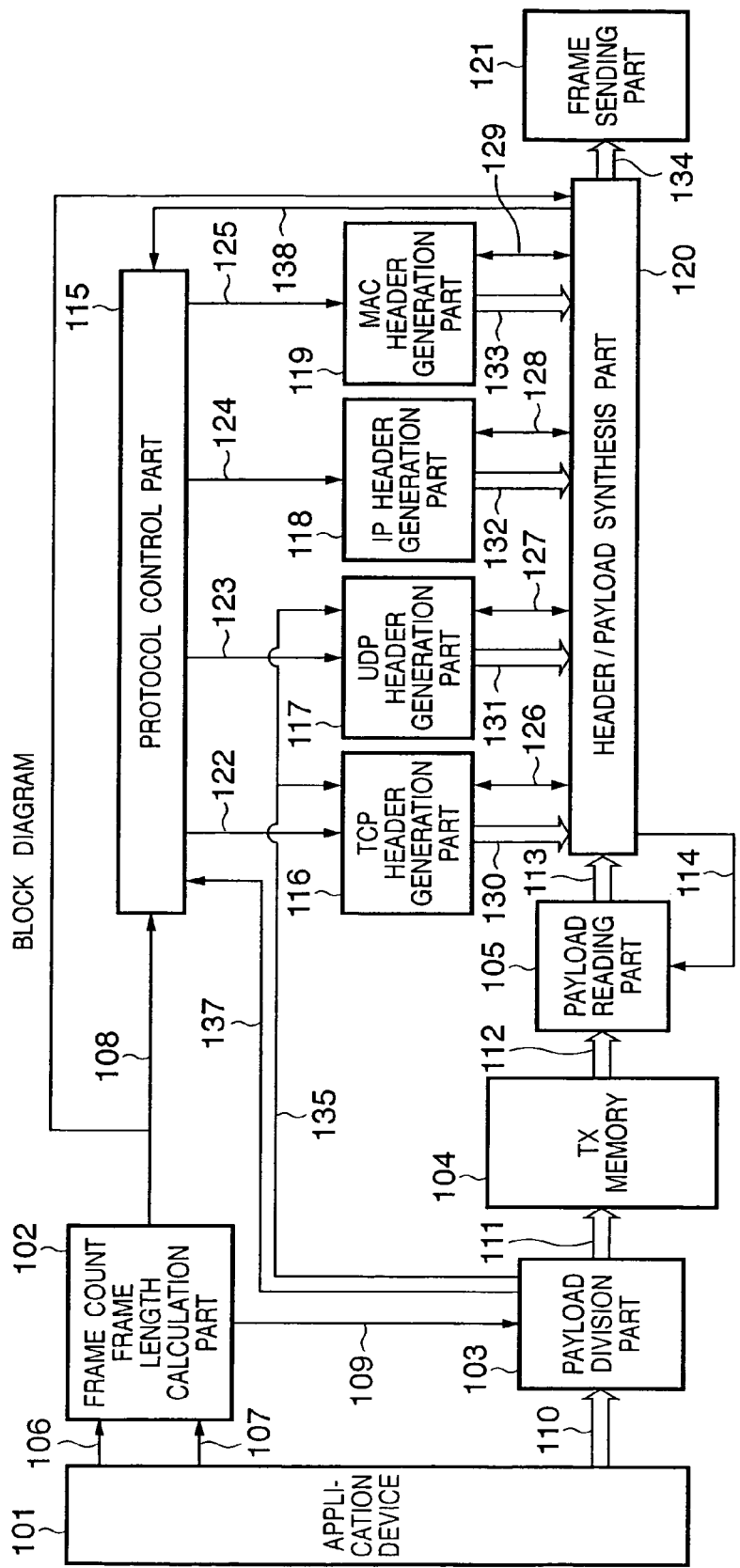
FIG. 11 is a block diagram of a communication control device according to a second embodiment of the invention.

FIG. 11 is a block diagram of a communication control device according to a second embodiment of the invention. Referring to FIG. 11, the configuration of the communication control device will be described below.

[Application Device]

An application device 101 outputs a transmission request 106 and a transmit data length 107 to a FFC 102, and outputs the transmit data 110 to a payload division part 103. Two kinds of application device 101 may be supposed. The first kind is a device of constant bit rate (information amount per unit time is constant). The second kind is a device of variable bit rate (information amount per unit time is variable, but explicit). Besides, a device in which the information from the device of variable bit rate is temporarily buffered, and shaped to output a constant amount of information periodically may be supposed. However, this device is regarded as the same device as the first kind. Also, a device for outputting the RAW information at a quantization bit rate predefined at the sampling frequency may be supposed. However, this device is regarded as the same device as the first kind.

The communication control device according to this embodiment which is connected to all the application devices 101 receives the transmission request 106, the transmit data length 107 and the transmit data 110 through an interface with the application devices 101.

[Frame Count Frame Length Calculation Part (FFC)]

The FFC 102 calculates how many frames the transmit data is divided into with a transmission request 106 inputted from the application device 101 as a trigger to be outputted, based on the transmit data length 107 similarly inputted. This flow for calculating the payload length and the number of headers is the same as the first embodiment as described using FIGS. 22A and 22B. As described above, the number of frames, head frame payload length, middle frame payload length and final frame payload length, as the values regarding the number of frames and the frame length, are outputted to the payload separation part 103, the protocol control part 115 and the header/payload synthesis part 120.

[Dividing by Payload Division Part]

The payload division part 103 divides the transmit data 110 given from the application device 101, based on the inputs 109 regarding the number of frames and the frame length given from the FFC 102. At the same time, the payload division part 103 writes the frame payload 111 in a payload TX memory 104. The payload division part 103 makes a transmission preparation completion notice 137 of frame payload to the protocol control part 115, after completion of writing the frame payload.

[Check Sum of Payload Division Part]

When the payload division part 103 writes the above transmission data in the payload TX memory 104, the check sum of frame payload is obtained for every frame, and the check sum value 135 is passed to a UDP header generation part 117 and a TCP header generation part 116.

[TX Memory]

The TX memory 104 stores one series of transmit data associated with one transmission request as a row of frame payloads in the frame payload FIFO for every transmission request. As shown in FIG. 5, one FIFO 340 is assigned with one transmission request inside the TX memory 104. In an example of FIG. 5, the transmit data with one transmission request is composed of five frame payloads.

In the example of FIG. 5, frame payload 1 (head frame) to frame payload 5 (last frame) are stored in the FIFO. When transmission occurs in a unit of frame, five frames are not accumulated in this way. Each frame payload may be extracted and transmitted by a payload reading part 105 immediately after being inserted into the FIFO.

[Payload Reading Part]

The payload reading part 105 takes out one frame payload 113 to be transmitted from the TX memory 104, and outputs it to the header/payload synthesis part 120, upon one payload reading instruction 114 from the header/payload synthesis part 120.

[Protocol Control Part]

Figure 12:
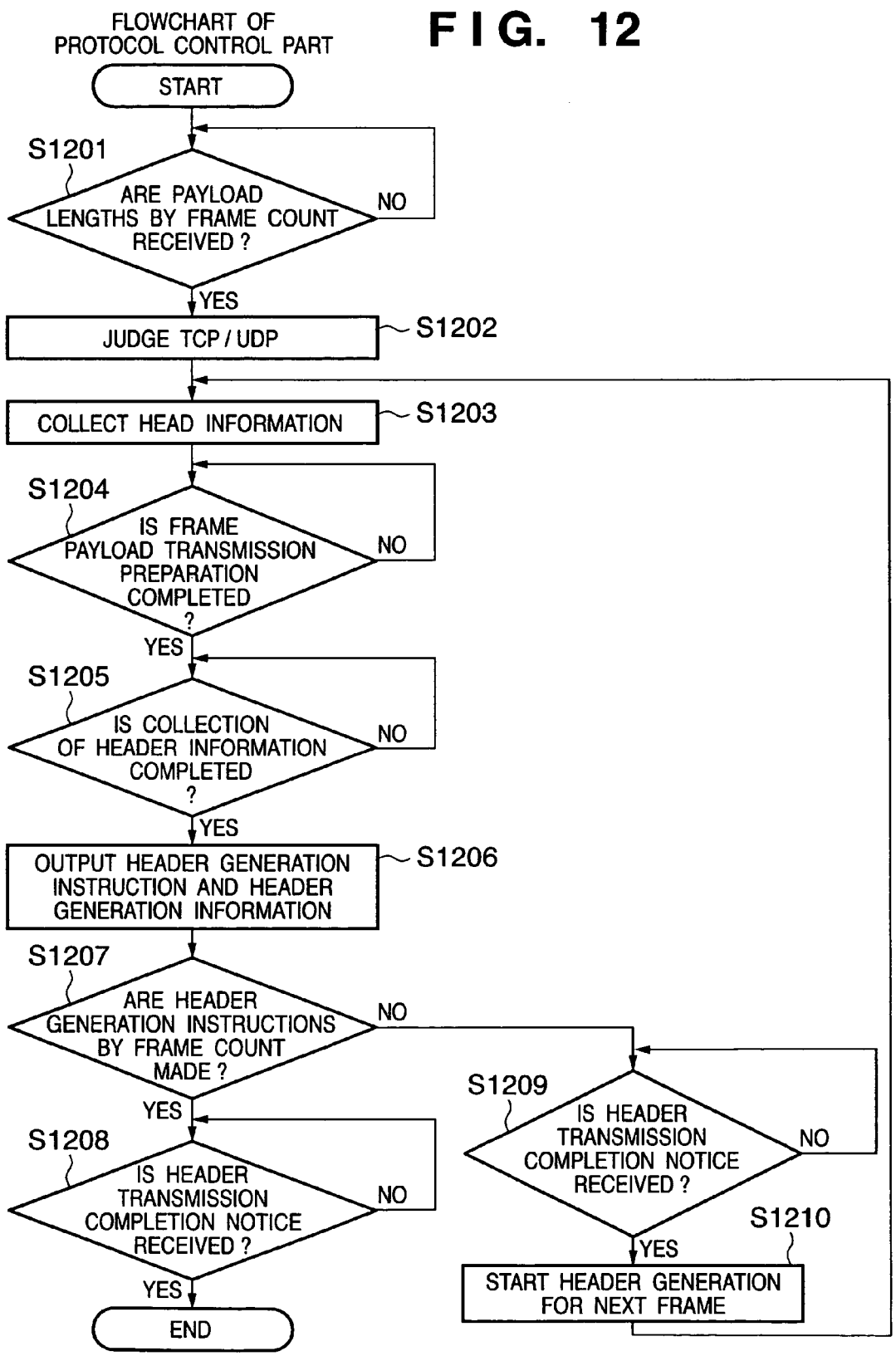
FIG. 12 is a flowchart showing a process of a protocol control part.

The protocol control part 115 specifies the required header for every frame, collects the information necessary for the header, and notifies the header generation instruction and header generation information 122 to 125 to each protocol header generation part 116 to 119, upon an instruction from the FFC 102. FIG. 12 shows a flowchart of the protocol control part 115.

At step S1201, it is judged whether or not four values 108 of the number of frames, payload length of head frame, payload length of middle frame, and payload length of final frame is received from the FFC 102. If received (step S1201: Yes), it is judged whether or not the transmission frame is TCP or UDP at step S1202 to collect the information for generating the protocol header required for frame transmission (step S1203). At this time, the information is collected only for the header to be appended to one frame. That is, only the information collection for the header appended to the head frame is initially performed.

Also, various kinds of information to be collected are set statically, or dynamically retrieved from the table. The examples of a dynamic table may include an address table, associated with connection, for indexing the destination IP address, originated IP address, destination port and originated port, and a routing table of IP.

Next, it is judged whether or not a frame payload transmission preparation completion notice 137 is received from the payload division part 103 (step 1204). Herein, if the frame payload transmission preparation completion notice 137 is received (step S1204: Yes), it is judged whether the collection of header information is ended at step S1205. If the collection of header information is ended (step S1205: Yes), a header generation instruction and the header generation information are outputted to the header generation part for generating the header required for transmission frame at step S1206.

After outputting the header generation instruction, it is judged whether or not the header generation instruction is made by the number of frames at step S1207. Herein, if the header generation instruction is made by the number of frames (step S1207: Yes), the procedure waits for a header transmission completion notice 138 for the header instructed to create at step S1206 to be received from the header/payload synthesis part 120 at step S1208. Thereafter, if the header transmission completion notice 138 is received, the protocol control is ended because the headers of all the frames for one datagram are transmitted.

Also, if the header generation instruction by the number of frames is not made at step S1207 (S1207: No), the procedure goes to step S1209, to generate the frame to be transmitted. The procedure then waits for the header transmission completion notice 138 for the header instructed to create at step S1206 to be received from the header/payload synthesis part 120. Thereafter, if the header transmission completion notice 138 is received, the creation of the header for the next frame is started (step S1210). And the procedure returns to step S1203.

[TCP Header Generation Part]

The TCP header generation part 116 starts to generate the header based on a header generation instruction and the header generation information from the protocol control part 115, and makes a TCP header generation completion notice 126 to the header/payload synthesis part 120 after completion of header generation. And if the TCP header generation instruction is received from the protocol control part 115, the TCP header information is acquired from the protocol control part 115. The TCP header information includes the originated port number, destination port number, sequence number, acknowledgement number, header length, flag bit, window size, emergency pointer, and destination IP address, originated IP address, and segment length for the pseudo header. The segment length is length that TCP header length and payload length are added. The pseudo header and the TCP header other than check sum are created from the acquired header generation information.

Next, the payload sum for every frame is received from the payload division part 103, and the check sum of TCP is calculated from the pseudo header, the TCP header other than check sum and the payload sum. And the check sum is set in a check sum field of the TCP header, completing the generation of the TCP header. If the generation of the TCP header is completed, a TCP header generation completion notice is issued to the header/payload synthesis part 120, whereby the generation of TCP header is ended. The procedure waits for the next header generation instruction to be made from the protocol control part 115. FIG. 14 shows the format of header created by the TCP header generation part 116, and FIG. 15 shows the pseudo header format.

Also, the TCP header generation part 116 receives an output request 126 from the header/payload synthesis part 120, and outputs the generated TCP headers 130 to the header/payload synthesis part 120.

[UDP Header Generation Part]

The UDP header generation part 117 starts to generate the header based on a header generation instruction and the header generation information from the protocol control part 115, and makes a UDP header generation completion notice 127 to the header/payload synthesis part 120 after completion of header generation.

If a UDP header generation instruction is received from the protocol control part 115, the UDP header information is acquired from the protocol control part 115. The UDP header information includes the originated port number, destination port number and UDP data length. The pseudo header and the UDP header other than check sum are created from the acquired header generation information.

Next, it is judged whether or not the payload sum is received from the payload division part 103. If received, the UDP check sum is calculated from the pseudo header, the UDP header other than check sum and the payload sum. And the check sum is set in a check sum field of the UDP header, completing the generation of the UDP header. If the generation of the UDP header is completed, a UDP header generation completion notice is issued to the header/payload synthesis part 120, whereby the generation of UDP header is ended.

The check sum of the UDP header is optionally treated. Whereby, if no UDP check sum is set, 0 is set in the UDP check sum field at the time when the UDP header information (originated port number, destination port number, UDP data length) is acquired from the protocol control part 115. After this setting, a UDP header generation completion notice is outputted to the header/payload synthesis part 120.

FIG. 16 shows the format of header created by the UDP header generation part 117, and FIG. 17 shows the pseudo header format.

Also, the UDP header generation part 117 receives an output request 127 from the header/payload synthesis part 120, and outputs the generated UDP header 131 to the header/payload synthesis part 120.

[IP Header Generation Part]

The IP header generation part 118 starts to generate the header based on a header generation instruction and the header generation information from the protocol control part 115, and makes an IP header generation completion notice 128 to the header/payload synthesis part 120 after completion of header generation. If an IP header generation instruction is received from the protocol control part 115, the IP header information is acquired from the protocol control part 115. The IP header information includes the version, header length, TOS, total length, identifier, flag, fragment offset, TTL, protocol, originated IP address and destination IP address. From these information, the header check sum of the IP header is calculated to complete the IP header, and an IP header generation completion notice is made to the header/payload synthesis part 120. FIG. 20 shows the format of header created by the IP header generation part 118.

Also, the IP header generation part 118 receives an output request 128 from the header/payload synthesis part 120, and outputs the IP headers 132 to the header/payload synthesis part 120 in the generated sequence.

[MAC Header Generation Part]

The MAC header generation part 119 starts to generate the header based on a header generation instruction and the header generation information from the protocol control part 115, and makes a MAC header generation completion notice 129 to the header/payload synthesis part 120 after completion of header generation. The MAC header generation part 119 receives a MAC header generation instruction from the protocol control part 115, and acquires the MAC header information. The MAC header generation information includes the header generation number, originated MAC address, destination MAC address and type length. From these information, the MAC header is completed, and a MAC header generation completion notice is made to the header/payload synthesis part 120. FIG. 21 shows the format of MAC header created by the MAC header generation part 119.

Also, the MAC header generation part 119 receives an output request 129 from the header/payload synthesis part 120, and outputs the generated MAC headers 133 to the header/payload synthesis part 120.

[Header/Payload Synthesis Part]

The header/payload synthesis part 120 deduces the number of headers to be generated from the number of frames from the FFC 102. Next, it is recognized that the header necessary for the transmission frame is completed, based on a header completion notice from each protocol header generation part. In the case of TCP/IP, the header/payload synthesis part makes an output request to the MAC header generation part 119, the IP header generation part 118, the TCP header generation part 116 and the payload reading part 105 in this order, reads the header and payload, synthesizes them as a frame, and outputs the frame to the frame sending part 121. In the case of UDP/IP, the header/payload synthesis part makes an output request to the MAC header generation part 119, the IP header generation part 118, the UDP header generation part 117 and the payload reading part 105 in this order for the head frame. The header/payload synthesis part makes an output request to the MAC header generation part 119, the IP header generation part 118 and the payload reading part 105 in this order for the middle and last frames, reads the header and payload, synthesizes them as a frame, and outputs the frame to the frame sending part 121. When the frame without payload is transmitted, the header/payload synthesis part reads the header only, synthesizes it as a frame, and outputs the frame to the frame sending part 121.

Also, the header/payload synthesis part 120 outputs a header transmission completion 138 to the protocol control part 115, when outputting the header to the frame sending part 121.

[Frame Sending Part]

The frame sending part 121 has a function of sending the frame outputted from the header/payload synthesis part 120 out of the communication control device. It makes the addition of preamble, frame padding, and generation of CRC conforming to IEEE802.3.

<Example of Transmitting TCP Segment>

Figure 13:
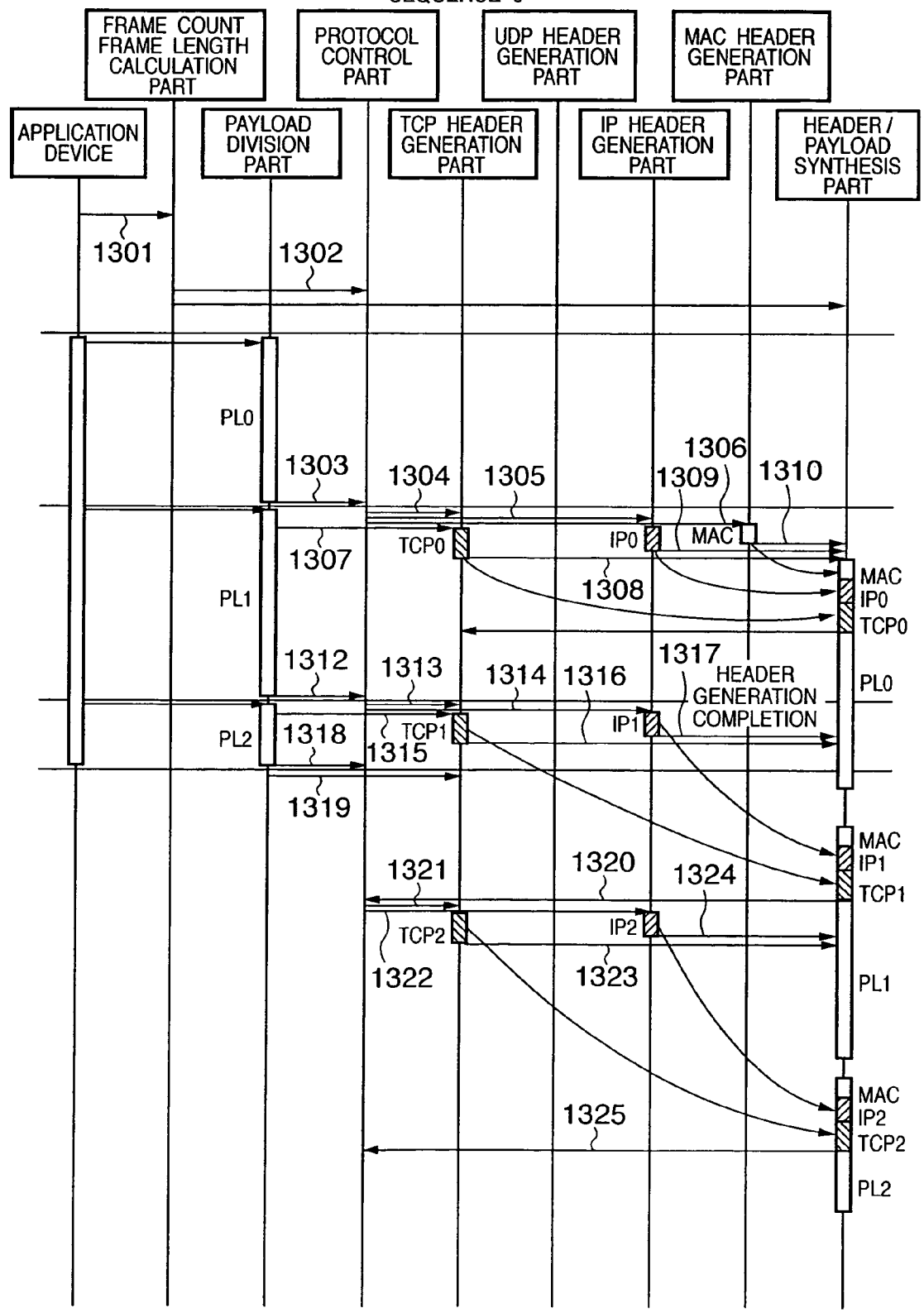
FIG. 13 is a flowchart showing the sequence 6.

FIG. 13 shows an example of dividing the transmit datagram into three segments when transmitting the TCP/IP frame.

The FFC 102, receiving a transmission instruction and the transmit data length 1301 from the application device 101, outputs the number of frames and payload length of head frame, middle frame and final frame 1302 to the protocol control part 115 and the header/payload synthesis part 120. The number of frames is three, payload length of head frame is PL0 length, payload length of middle frame is PL1 length, and payload length of final frame is PL2 length. The protocol control part 115 judges that the protocol type is TCP, and collects the header information of TCP, IP and MAC.

Also, the payload is written into the TX memory 104 by the payload division part 103. If the writing of one frame (1TCP segment) is completed, a frame payload transmission preparation completion 1303 is outputted to the protocol control part 115. The protocol control part 115 receiving a frame payload transmission preparation completion 1303 judges whether or not the collection of header information for generating TCP, IP and MAC headers for the head frame segmented from the datagram is ended. Herein, if ended, a header generation instruction and the header information 1304 are outputted to the TCP header generation part 116, a header generation instruction and the header information 1305 are outputted to the IP header generation part 118, and a header generation instruction and the header information 1306 are outputted to the MAC header generation part 119.

The TCP header generation part 116 receiving the header generation instruction generates a TCP header based on the header information from the protocol control part 115 and a payload sum 1307 from the payload division part 103. The TCP header generation part 116 then outputs a TCP header generation completion 1308 to the header/payload synthesis part 120. The IP header generation part 118 receiving the header generation instruction generates an IP header based on the header information from the protocol control part 115, and outputs an IP header generation completion 1309 to the header/payload synthesis part 120.

The MAC header generation part 119 receiving the header generation instruction generates a MAC header based on the header information from the protocol control part 115, and outputs the MAC header generation completions 1310 by the number of frames to the header/payload synthesis part 120. The header/payload synthesis part 120 recognizes that the TCP header, IP header and MAC header are required for the head frame in three segmented frames from the frame count 1302 received from the FFC 102. Whereby, the header/payload synthesis part 120 judges that the frame is transmittable, if it receives all of the TCP header generation completion 1308, the IP header generation completion 1309 and the MAC header generation completion 1310.

The header/payload synthesis part 120 reads the MAC header, IP header, TCP header and payload, and outputs the head frame to the frame sending part 121. Also, a header transmission completion 1311 is outputted to the protocol control part 115 at the time when the MAC, IP and TCP headers are outputted to the frame sending part 121.

The protocol control part 115 receiving the header transmission completion 1311 collects the header information of the next frame, or the middle frame in the three segmented frames here. The headers required for the middle frame, like the head frame, are the TCP, IP and MAC headers to collect the information. If the payload transmission preparation completion 1312 for the next frame is received from the payload division part 103, it is judged that the collection of header information for generating the TCP, IP and MAC headers for the middle frame is ended. If ended, a header generation instruction and the header information 1313 are outputted to the TCP header generation part 116 and a header generation instruction and the header information 1314 are outputted to the IP header generation part 118 at the same time.

The TCP header generation part 116 receiving the header generation instruction generates the TCP header from the header information from the protocol control part 115 and the payload sum 1315 from the payload division part 103. The TCP header generation part 116 then outputs a TCP header generation completion 1316 to the header/payload synthesis part 120. The IP header generation part 118 receiving the header generation instruction generates the IP header from the header information from the protocol control part 115, and outputs an IP header generation completion 1317 to the header/payload synthesis part 120.

The header/payload synthesis part 120 recognizes that the TCP header, IP header and MAC header are required for the middle frame in three segmented frames from the frame count 1302 received from the FFC 102. Whereby, The header/payload synthesis part 120 judges that the frame is transmittable, if it receives the TCP header generation completion 1316 and the IP header generation completion 1317. Since plural MAC header generation completions by the number of frames are outputted for the head frame, the header/payload synthesis part 120 judges that the generation of MAC headers for the middle frame is completed at this point of time. The header/payload synthesis part 120, judging that the frame is transmittable, reads the MAC header, IP header, TCP header and payload, and outputs the middle frame to the frame sending part 121. Also, a header transmission completion 1320 is outputted to the protocol control part 115 at the time when the MAC, IP and TCP headers are outputted to the frame sending part 121.

The protocol control part 115 receiving the header transmission completion 1320 collects the header information of the next frame, or the final frame in the three segmented frames here. The headers required for the final frame, like the head and middle frames, are the TCP, IP and MAC headers to collect the information. In the protocol control part 115, the payload transmission preparation completion 1318 for the next frame is already received from the payload division part 103. Therefore, if the collection of header information for generating the TCP, IP and MAC headers is ended, a header generation instruction and the header information 1321 are outputted to the TCP header generation part 116 and a header generation instruction and the header information 1322 are outputted to the IP header generation part 118 at the same time.

The TCP header generation part 116 receiving the header generation instruction generates the TCP header from the header information from the protocol control part 115 and the payload sum 1319 from the payload division part 103. The TCP header generation part 116 then outputs a TCP header generation completion 1323 to the header/payload synthesis part 120. The IP header generation part 118 receiving the header generation instruction generates the IP header from the header information from the protocol control part 115, and outputs an IP header generation completion 1324 to the header/payload synthesis part 120.

The header/payload synthesis part 120 recognizes that the TCP header, IP header and MAC header are required for the final frame in three segmented frames from the frame count 1302 received from the FFC 102. Whereby, the header/payload synthesis part 120 judges that the frame is transmittable, if it receives the TCP header generation completion 1323 and the IP header generation completion 1324. Since plural MAC header generation completions by the number of frames are outputted for the head frame, the header/payload synthesis part 120 judges that the generation of MAC headers for the middle frame is completed at this point of time. The header/payload synthesis part 120, judging that the frame is transmittable, reads the MAC header, IP header, TCP header and payload, and outputs the final frame to the frame sending part 121. Also, a header transmission completion 1325 is outputted to the protocol control part 115 at the time when the MAC, IP and TCP headers are outputted to the frame sending part.

As described above, according to each embodiment, having the CPU of low price or without the CPU, the transmit data of arbitrary length is received from the application device, and the frame is outputted in the frame size appropriate for the data link layer to be supported.

The frame count frame length calculation part calculates the number of frames and the frame length for transmitting the transmit data upon a data transmission request. The payload division part divides the transmit data into frame units, based on the number of frames and the frame length calculated by the frame count frame length calculation part. The header generation part generates the header to be appended to the transmit data of frame unit, based on the number of frames and the frame length calculated by the frame count frame length calculation part. In this case, the header generation part generates the header to be appended to the transmit data while the payload division part inputs the transmit data.

The payload division part calculates the check sum for every frame by adding the transmit data of frame units. The header generation part appends the check sum to the header. Thereby, the frame with header can be outputted in a short period since the transmit data is received.

The payload division part outputs a division completion notice of frame unit every time dividing the inputted transmit data of one frame even while the transmit data of plural frames is being inputted. The header generation part generates the header of frame unit upon the division completion notice of frame unit. Also, the header generation part outputs a header generation completion notice of frame unit every time generating the header of each frame even while the transmit data of plural frames is being inputted by the payload division part. The header/payload synthesis part synthesizes the transmit data of frame unit and the header upon the header generation completion notice of frame unit. Thereby, the transmission of each frame composing the transmit data can be started even while the long transmit data corresponding to plural frames is being received from the application device.

In this way the first and second embodiments are reviewed as follows.

(1) Firstly calculate how many frames the transmission instruction is divided into, upon a transmission request from the application device. That is, the payload length for head frame, the payload length for middle frame and payload length for final frame are calculated to output the transmit data associated with one transmission instruction in many frames.

(2) Start to generate the header to send out the transmit data as frames and generate (divide) the frame payload simultaneously, based on the results of (1).

(3) Start to generate the header for each protocol stack (TCP/UDP/IP/MAC) simultaneously because the number of frames and the payload length are known.

(4) When the transmit data is received from the application device and temporarily saved in memory, divide the transmit data into payload units and store it in payload units, because the payload length is known.

(5) Synthesize the header and payload in frame unit to output the frame because the header is generated and the payload is saved in frame unit. This frame output may be made after receiving all the transmit data from the application device, but the first frame may be outputted immediately after receiving the first frame of the transmit data from the application device.

According to the first and second embodiments, the parallel processing capability of the hardware can be exhibited, and the memory management method simplified. The communication control device (TOE or protocol control device) has a large throughput (wide bandwidth). As soon as the transmit data from the application is completely inputted into the communication control device (TOE or protocol control device), it is transmittable as the frame to the interface. That is, there is hardly a delay time for outputting the transmit data from the application device as the frame to the network interface.

Also, it is unnecessary to secure the memory area for writing the header to be appended to the frame by generating the header in frame unit.

The above embodiments are only illustrative for carrying out the invention, and must not be construed as limiting the technical scope of the invention. That is, this invention may be implemented in various ways without departing from the technical idea or its principal features.

Though the preferred embodiments of the invention have been described above, the invention is not limited to the above embodiments, but various modifications may be made within the scope of the invention as defined in the claims.

CLAIM OF PRIORITY

This application claims priority from Japanese Patent Applications No. 2004-264645 and No. 2004-264644 both filed on Sep. 10, 2004, the entire contents of which are hereby incorporated by reference herein.

What is claimed is:

1. A communication control apparatus comprising:
   a calculation device configured to calculate number of frames and frame length for transmitting transmit data;
   a division device configured to divide the transmit data into frame units based on the calculation results by said calculation device; and
   a header generation device configured to generate a header to be appended to the transmit data of said frame unit based on the calculation results by said calculation device in parallel with division of the transmit data by said division device,
wherein the header generation device generates each header of a plurality of protocol layers in parallel.

2. The communication control apparatus according to claim 1, wherein said calculation device calculates said number of frames and said frame length upon a data transmission request, and said header generation device generates the header to be appended to the transmit data while the transmit data is being inputted by said division device.

3. The communication control apparatus according to claim 1, wherein said division device calculates a check sum for every frame by adding the transmit data of frame unit, and said header generation device appends said check sum to said header.

4. The communication control apparatus according to claim 1, wherein said division device outputs a division completion notice of frame unit every time of inputting and dividing the transmit data of one frame, even while inputting the transmit data of plural frames, and said header generation device generates said header of frame unit upon said division completion notice of frame unit.

5. The communication control apparatus according to claim 1, wherein said header generation device outputs a header generation completion notice of frame unit every time of generating the header for each frame, even while said division device is inputting the transmit data of plural frames, and said apparatus has a synthesis device configured to synthesize the transmit data and the header of said frame unit upon said header generation completion notice of frame unit.

6. The communication control apparatus according to claim 5, further comprising a protocol control device configured to collect the header generation information required for generating the frame, and to output a header generation instruction and the header generation information for every frame, wherein said header generation device inputs said header generation instruction and said header generation information from said protocol control device and outputs a header generation completion notice by generating the header.

7. The communication control apparatus according to claim 5, further comprising a frame transmitting device configured to transmit the frame synthesized by said synthesis device.

8. The communication control apparatus according to claim 7, further comprising a memory for storing the transmit data of frame units divided by said division device.

9. The communication control apparatus according to claim 8, further comprising a reading device configured to read the transmit data of frame units from said memory and to output it to said synthesis device.

10. The communication control apparatus according to claim 5, wherein said header generation device comprises a TCP header generation device configured to generate a TCP header, a UDP header generation device configured to generate a UDP header, an IP header generation device configured to generate an IP header, and a MAC header generation device configured to generate a MAC header, and said protocol control device outputs an instruction of generating a desired header.

11. A communication control apparatus comprising:
a protocol control device configured to collect header generation information required for generating a frame, and to output a header generation instruction and the header generation information for every frame;
a header generation device configured to generate a header for every frame and to output a header generation completion notice if said header generation instruction and said header generation information are inputted from said protocol control device; and
a header/payload synthesis device configured to synthesize said generated header and payload of frame unit into the frame if said header generation completion notice is inputted from said header generation device,
wherein the header generation device generates each header of a plurality of protocol layers in parallel.

12. The communication control apparatus according to claim 11, wherein said header generation device comprises a TCP header generation device configured to generate a TCP header for every one header, a UDP header generation device configured to generate a UDP header for every one header, an IP header generation device configured to generate an IP header for every one header, and a MAC header generation device configured to generate a MAC header for every one header, and said protocol control device outputs an instruction of generating a desired header.

13. The communication control apparatus according to claim 11, wherein after said header/payload synthesis device outputs a header synthesized as a previous frame, said protocol control device outputs a header generation instruction of a next frame to said header generation device.

14. The communication control apparatus according to claim 11, further comprising a memory for storing a payload of frame unit, wherein said protocol control device outputs the header generation instruction corresponding to the payload to said header generation device after the payload is written into said memory.

15. The communication control apparatus according to claim 11, further comprising a memory for storing a payload of frame unit, wherein said protocol control device outputs the header generation instruction of a next frame to said header generation device after said header/payload synthesis device outputs the header synthesized as a previous frame, and after the next payload is written into said memory.

16. The communication control apparatus according to claim 11, further comprising a frame transmitting device configured to transmit the frame synthesized by said header/payload synthesis device.

17. The communication control apparatus according to claim 16, further comprising a payload division device configured to divide the transmit data into the payloads of frame units.

18. The communication control apparatus according to claim 17, further comprising a memory for storing the payloads of frame units divided by said payload division device.

19. The communication control apparatus according to claim 18, further comprising a payload reading device configured to read the payloads of frame units from said memory and to output them to said header/payload synthesis device.

20. The communication control apparatus according to claim 19, further comprising a frame count frame length calculation device configured to calculate number of frames and frame length based on the length of transmit data, wherein said payload division device divides the payload based on the number of frames and the frame length that are calculated.

21. A communication control method comprising:
a calculation step of calculating number of frames and frame length for transmitting transmit data;
a division step of dividing the transmit data into frame units based on the calculation results in the calculation step; and a header generation step of generating a header to be appended to the transmit data of said frame unit based on the calculation results in the calculation step, the header generation step being started in parallel with division of the transmit data in the division step, wherein, in the header generation step, each header of a plurality of protocol layers is generated in parallel.

22. A communication control method comprising:

a protocol control step of collecting header generation information required for generating a frame, and outputting a header generation instruction and the header generation information for every frame;

a header generation step of generating a header for every frame and outputting a header generation completion notice if said header generation instruction and said header generation information are inputted; and a header/payload synthesis step of synthesizing said generated header and payload of frame unit into the frame if said header generation completion notice is inputted, wherein, in the header generation step, each header of a plurality of protocol layers is generated in parallel.

* * * * *